United States Patent
Ohtani

(10) Patent No.: US 7,508,762 B2
(45) Date of Patent: Mar. 24, 2009

(54) NETWORK COMMUNICATION MANAGEMENT METHOD AND SYSTEM

(75) Inventor: Yoshihiro Ohtani, Kyoto (JP)

(73) Assignee: Sharp Kabushiki Kaisha, Osaka (JP)

(*) Notice: Subject to any disclaimer, the term of this patent is extended or adjusted under 35 U.S.C. 154(b) by 335 days.

(21) Appl. No.: 10/532,049

(22) PCT Filed: Oct. 6, 2003

(86) PCT No.: PCT/JP03/12808

§ 371 (c)(1),
(2), (4) Date: Apr. 21, 2005

(87) PCT Pub. No.: WO2004/039009

PCT Pub. Date: May 6, 2004

(65) Prior Publication Data

US 2006/0057968 A1     Mar. 16, 2006

(30) Foreign Application Priority Data

Oct. 23, 2002 (JP) ............................. 2002-308954
Nov. 8, 2002 (JP) ............................. 2002-324916

(51) Int. Cl.
*G08C 15/00* (2006.01)
(52) U.S. Cl. .................... 370/235; 370/395.41; 370/461
(58) Field of Classification Search ................. 370/346, 370/449, 395.4, 343, 344, 235, 461
See application file for complete search history.

(56) References Cited

U.S. PATENT DOCUMENTS 5,537,414 A    7/1996   Takiyasu et al.
6,449,259 B1*   9/2002   Allain et al. ................. 370/253
2002/0120740 A1   8/2002   Ho et al.
2003/0063563 A1*   4/2003   Kowalski ..................... 370/230
2003/0223365 A1*   12/2003   Kowalski ................. 370/230.1
2004/0073939 A1*   4/2004   Ayyagari ..................... 725/110
2006/0052088 A1*   3/2006   Pavon et al. ............. 455/414.1

FOREIGN PATENT DOCUMENTS

EP      1 237 382 A2    9/2002
JP      6-77963 A    3/1994
JP      2002-319895 A    10/2002

* cited by examiner

OTHER PUBLICATIONS

"Medium access control (MAC) enhancements for qualiity of service (QoS)" IEEE Std 802.11e/D3.3, Oct. 2002 (Draft Supplement to IEEE Std. 802.11, 1999 Edition), pp. i-vi and 1-123.

*Primary Examiner*—Kwang B. Yao
*Assistant Examiner*—Kenan Cehic
(74) *Attorney, Agent, or Firm*—Birch, Stewart, Kolasch & Birch, LLP

(57) ABSTRACT

A central control station carries out allocations of transmission rights according to a rule that a value obtained by subtracting (i) a value of a broken line (11) from (ii) a value of a straight line (10) is always limited according to a certain constant value (TXOP bound) smaller than C·T delay, where the broken line (11) indicates a sum of transmission granting time periods allocated from a certain time point t0 by "an actual transmission right allocation", the straight line (10) indicates a sum of transmission right granted time periods allocated according to "a reference transmission right allocation obtained by the average data rate or the like of a communication station", and C·T delay is an average sum of transmission right granted time periods allocated to the tolerable transmission delay time according to the reference transmission right allocation.

34 Claims, 24 Drawing Sheets

FIG. 7

| PHYSICAL RATE RPHY | NUMBER OF BITS PER SYMBOL NDBPS |
|---|---|
| 6Mbps | 24 |
| 9Mbps | 36 |
| 12Mbps | 48 |
| 18Mbps | 72 |
| 24Mbps | 96 |
| 36Mbps | 144 |
| 48Mbps | 192 |
| 54Mbps | 216 |

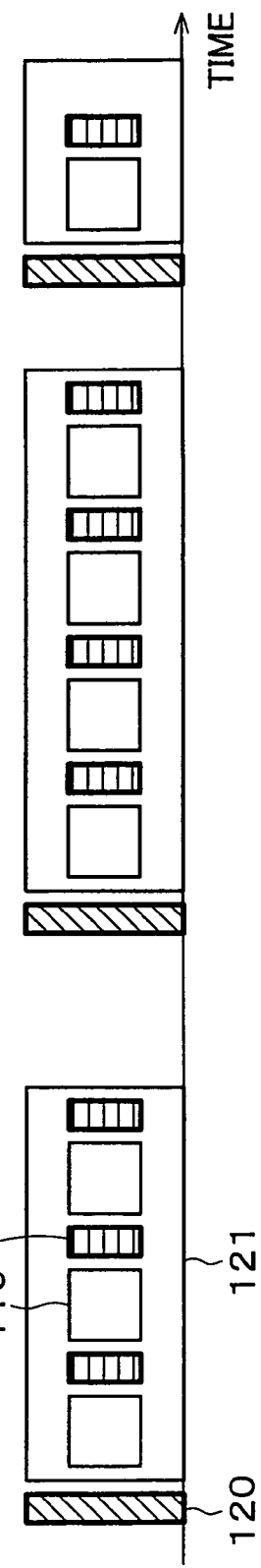
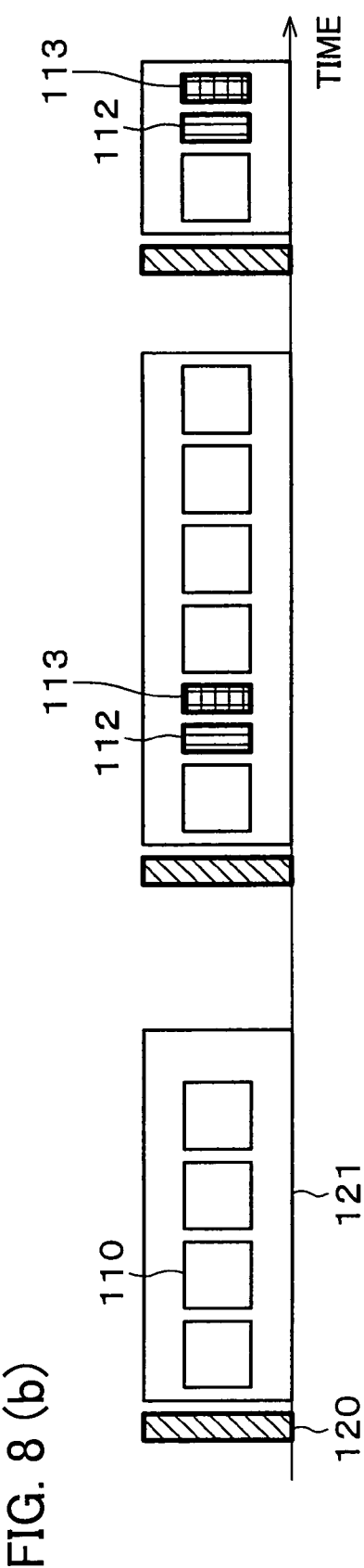

NETWORK COMMUNICATION MANAGEMENT METHOD AND SYSTEM

TECHNICAL FIELD

The present invention relates to a communication management method, a central control station, a communication station, a communication management program, and a computer-readable recording medium storing therein the communication management program each of which is for managing communication (such as IEEE 802.11 wireless communication) in a network in which a plurality of communication stations share one network path in a time-divisional manner.

BACKGROUND ART

In recent years, LAN (Local Area Network) is becoming more important. In such network, a plurality of communication stations connected to the network share one medium in order to transmit packets. However, in the case in which a plurality of transmission stations transmit the packets at the same time, the packets collide with each other. Here, it becomes necessary to define a mechanism for effectively avoiding the collision.

For example, a CSMA/CA (Carrier Sense Multiple Access/Collision Avoidance) based collision avoidance method; called DCF (Distributed Coordination Function), is defined in the IEEE 802.11 wireless communication method (conforming to the ANSI/IEEE Std 802.11, 1999 Edition) which is the reference for Wireless LAN.

In such conventional network, transmission rights are equally granted with respect to all the transmission stations. Therefore, in the case in which the total amount of traffics flowing in the network is increased, the bandwidth for each stream is reduced. This will be a problem for flowing real time stream data, such as videos and voices each of whose transmission delay time is limited. That is, such stream data is not transmitted properly in the case in which the network is congested.

In order to properly transmit the stream data, various mechanisms for securing the bandwidth have been developed. As shown in FIG. 5, one method for securing the bandwidth is that a central control station 102 in the network manages a part of the bandwidth necessary for transmitting data from a transmission station (communication station) 100 to a reception station (communication station) 101. In such method, (i) a transmission station notifies the central control station of information concerning a traffic property of the stream data to be flown through the network, (ii) the central control station judges whether or not the transmission of the stream data is acceptable, and then (iii) if it is judged that the transmission of the stream data is acceptable, the central control station grants the transmission right to the transmission station.

Regarding the IEEE 802.11 wireless communication method, a subgroup called TGE is discussing a function of the central control station, the function called HCF (Hybrid Coordination Function) for managing the bandwidth in the wireless network. According to the draft (conforming to IEEE Std 802.11e/D3.3, 2002) designed by TGE in the conference held on September, 2002, the central control station called an HC (Hybrid Coordinator) manages a part of transmission rights of the traffics of the transmission stations belonging to the network. The communication stations other than the HC are called WSTA (Wireless Station).

A WSTA notifies the HC of information concerning the traffic property of data to be transmitted from the WSTA itself or information concerning a polling request specification. The information is called Traffic Specification (TSPEC). The information concerning the traffic property of data is, for example, minimum/average/maximum data rates of the traffic, a tolerable transmission delay time, and the like information, and the information concerning the polling request specification is, for example, minimum/maximum time intervals between two successive times at which polling is desired, and the like information. Major parameters of the TSPEC currently defined in Draft 3.3 are as follows:

TSInfo ACK Policy indicates (i) whether or not ACK (acknowledgement) is necessary and (ii) a desired form of ACK, as follows: "00" indicates "Normal ACK", "10" indicates "No ACK", "01" indicates "Alternate ACK", and "11" indicates "Group ACK";

Direction specifies as follows: "00" indicates "Up link", "10" indicates "Down link", "01" indicates "Direct link", and "11" indicates "reserved".

Minimum Data Rate specifies a lowest data rate (in units of bps) of a traffic. The Minimum Data Rate does not include MAC/PHY Overheads. "0" indicates that the Minimum Data Rate is not specified.

Mean Data Rate indicates an average data rate (in units of bps) of the traffic. The Mean Data Rate does not include the MAC/PHY Overheads. "0" indicates that the Mean Data Rate is not specified.

Peak Data Rate indicates a maximum allowable data rate (in units of bps) of the traffic. "0" indicates that the Peak Data Rate is not specified.

Max Burst Size indicates a maximum data burst (in units of octets) of the traffic that arrives at Peak Data Rate. This is a parameter for a variable rate traffic or for a burst traffic. A value of 0 indicates that there are no bursts.

Nominal MSDU Size indicates a normal size (in units of octets) of MSDU. The MSDU size indicates the size of data transmitted/received from/to an upper layer to/from the MAC layer. Moreover, the MSDU size is equal to a length obtained by subtracting headers of the MAC and physical layers from the packet. An MSDU Size of 0 indicates that the Nominal MSDU size is not specified.

Inactivity Interval indicates a maximum amount of time (in units of $\mu s$) that may elapse until a connection is cut by the central control station in the case in which the traffic of MSDU is not flowing. If the inactivity interval is "0", the connection will be continued without Inactivity interval.

Delay Bound indicates a maximum amount of time (in units of $\mu s$) allowed to transport an MSDU belonging to the traffic. "0" indicates that the Delay Bound is not specified.

Min PHY Rate indicates a minimum physical rate (in units of bps) of the traffic. "0" indicates the Min PHY Rate is not specified.

Minimum Service Interval indicates a minimum value of an interval between time points when the transmission right for a traffic is granted. In the case in which the Direction field is set to Uplink/Sidelink, the HC carries out polling. Therefore, this parameter indicates a minimum interval (in units of $\mu s$) between the start time of two successive QoS CF-POLLs (will be described later). a communication station that wants to save power sets this parameter.

Maximum Service Interval indicates a maximum value of an interval between time points when the transmission right for a traffic is granted. In the case in which the Direction field is set to Uplink/Sidelink, the HC carries out polling. Therefore, this parameter indicates a maximum interval (in units of us) between the start time of two successive QoS CF-POLLs (will be described later).

Surplus Bandwidth Allowance Factor indicates the excess allocation of time (bandwidth) over and above the rates required to transport an MSDU belonging to the traffic. This field indicates a ratio of over-the-air bandwidth, including retransmissions and the MAC/PHY overheads, to bandwidth of the transported MDSUs required for successful transmission.

In order to meet requests from the WSTAs, the HC having received TSPEC from each WSTA carries out a calculation (scheduling) for determining an order and time periods for granting the transmission rights with respect to those stations that are to carries out transmission. Then, based on results of the scheduling, the HC grants the transmission right with respect to the WSTAs.

A transmission right granted time period granted by the HC to a station is called a TXOP (Transmission Opportunity). The HC transmits a packet called QoS CF-POLL to the WSTA to which the transmission right is about to be granted. In this way, the TXOP is granted to each transmission station. The QoS CF-POLL packet contains information concerning a time limit within which the transmission right is granted, the information called a TXOP LIMIT. The WSTA to which QoS CF-POLL is transmitted is allowed to transmit data within the time limit.

A unit of data that an upper layer of a communication station requests the MAC layer of the communication layer to transmit is called an MSDU (MAC Service Data Unit). Actual transmission of the MSDU through a medium is carried out by transmitting the MSDU in a form of a packet. The packet is normally formed by adding protocol headers of the MAC layer and the physical layer to one MSDU.

The current draft defines a method using Normal ACK and a method using Group ACK as a method of giving the acknowledgement from the reception station to the transmission station in transmitting data from the transmission station to the reception station. FIG. 6(a) is a diagram showing the method using Normal ACK, and FIG. 6(b) is a diagram showing the method using Group ACK. As illustrated in FIGS. 6, according to the method using Normal ACK, each time the transmission station transmits a packet 110, acknowledgement (ACK) 111 with respect to the packet 110 returns from the reception station. Meanwhile, according to the method using Group ACK, the transmission station transmits a plurality of packets 111 to the reception station in a burst manner. Then, in the case in which the transmission station transmits a packet 112 called Group ACK Request and the packet 112 is received by the reception station, the reception station returns a packet 113 to the transmission station, the packet 113 called Group ACK including the acknowledgements with respect to the packets which have been transmitted from the transmission station.

The number of packets transmitted according to a burst transmission is not necessarily a fixed number. As a typical sequence, considered here is a pattern in which a fixed number of packets (N packets in FIG. 6) are periodically transmitted by the burst transmission as shown in FIG. 6. Here, the number N is called a burst length.

By using the method of Group ACK, the acknowledgements with respect to a plurality of packets can be notified to the transmission station at one time. On this account, using the method of Group ACK has a better efficiency for bandwidth utilization than using the method of Normal ACK. In addition, the longer the burst length N is, the better the efficiency for bandwidth utilization becomes. However, the longer the burst length N becomes, the lower the frequency of returning the acknowledgements becomes, and thus the number of times the same packet can be retransmitted within a certain time period is reduced.

For example, in the case of using a physical layer conforming to IEEE 802.11a, a method of calculating a time period necessary for transmitting one packet by using Normal ACK is as follows: in the case in which a packet is a QoS Data packet, there are two parameters: MSDU size: L (bit) Physical rate: R PHY. A N DBPS (a number of bits transmitted per symbol) in OFDM used in the physical layer conforming to IEEE 802.11a is determined from a RPHY (physical rate), as shown in FIG. 7. Therefore, N SYM (the number of OFDM symbols necessary for transmitting L (bit) MSDU) can be obtained by the following formula:

$$N\ SYM = ceiling\ \{(310+L)/N\ DBPS\}.$$

A TQoSData (time period necessary for transmitting one packet) can be obtained by the following formula:

$$TQoSData = 20 + 4 \times N\ SYM.\ (\mu s)$$

As for an ACK packet to be returned by the reception station after receiving the QoSData packet, the physical rate R PHY (ACK) of the ACK packet is determined according to the physical rate of the QoSData packet. Moreover, the value of N DBPS is determined according to R PHY (ACK) (see FIG. 7). The number N SYM of OFDM symbols necessary for transmitting the ACK packet can be calculated by the following formula:

$$N\ SYM = ceiling\ (134/N\ DBPS).$$

Therefore, a T ACK (time period for transmitting one packet) can be obtained by the following formula:

$$T\ ACK = 20 + 4 \times N\ SYM.\ (\mu s)$$

According to the above calculations, a reference time period T normal (L, R PHY) necessary for exchanging the QoSData packet and the ACK packet can be obtained by the following formula:

$$T\ normal\ (L,\ R\ PHY) = TQoSData + SIFS + T\ ACK + SIFS,\ (\mu s)$$

where SIFS is a gap time between two successive packets. The SIFS is 16 (μs) concretely in the case of using the physical layer conforming to IEEE 802.11a.

Similarly, a method of calculating an average time period necessary for transmitting one packet by using Group ACK is as follows.

The time period TQoSData necessary for transmitting the QoS Data packet can be obtained by the same formula as that of the case of Normal ACK.

As for a time period necessary for transmitting a Group ACK Request packet, because the physical rate R PHY (GAR) of the Group ACK Request packet is determined according to the physical rate R PHY of the QoSData packet, the N DBPS corresponding to R PHY (GAR) is obtained according to FIG. 7. Moreover, the T GAR (time period for transmitting one packet) is determined according to the following formulas:

$$N\ SYM = ceiling\ (214/N\ DBPS),$$

$$T\ GAR = 20 + 4 \times N\ SYM.\ (\mu s)$$

Meanwhile, as for a time period necessary for transmitting the Group ACK packet, because the physical rate R PHY (GA) of the Group ACK packet is determined according to the physical rate R PHY of the QoS Data packet, the N BPS corresponding to R PHY is obtained according to FIG. 7. Moreover, the T GA (time period for transmitting one packet) is determined according to the following formulas:

$N\ SYM$=ceiling (1238/$NDBPS$), $T\ GA$=20+4×$NSYM$. (μs)

A reference time period T group (N) (L, R PHY) necessary for exchanging N QoS Data packets and the Group ACK Request/Group ACK packet can be obtained by the following formula:

$T$ group $(N)(L,\ R\ PHY)$=$N\cdot TQoS$Data+$SIFS$+$T\ GAR$+ $SIFS$+$T\ GA$+$SIFS$. (μs)

A reference value T group (L, R PHY) of an average time period necessary for transmitting one packet in the case of transmitting the packet by using a Group ACK sequence having the burst length N can be obtained by the following formula:

$T$ group $(L,\ R\ PHY)$=$T$ group $(N)/N$. (μs)

From the above calculations the parameters for transmitting data by using Group ACK can be obtained from the MSDU size of the packet, the physical rate for transmitting the packet and the burst length N.

In the case of the transmission using Group ACK, the efficiency for bandwidth utilization changes according to the burst length N. Therefore, an hour rate of the TXOP allocated by the central control station to the stations changes. However, because the communication station is allowed to send a Group ACK Request/Group ACK packet at any time, the concept "burst length" does not exist in the specification, and a mechanism of transmitting the burst length to the central control station is not defined, either. Instead, a control station can notify the central control station of Surplus Bandwidth Allowance of TSPEC. Surplus Bandwidth Allowance is information corresponding to a rate of a bandwidth (or an average time period for transmission), which is expected to be actually necessary, to the bandwidth (or an average time period for transmission) of the case of using Normal ACK. The following is a method of calculating Surplus Bandwidth Allowance transmitted to the central control station from the communication station which uses Group ACK and transmits the packets of the burst length N. That is, the value of Surplus Bandwidth Allowance (A surp) required to be set in TSPEC is obtained by the following formula:

$A$ surp=$T$ group $(L,\ R\ PHY)/T$ normal $(L,\ R\ PHY)$.

Although the current draft does not state so clearly, there is a possibility that a rule will be set in which the transmission station calculates an additional bandwidth (or additional transmitting time) necessary for retransmitting the packets, and creates Surplus Bandwidth Allowance (A surp) with the additional bandwidth included therein so as to apply for a value taking the additional bandwidth in consideration. In the case in which PER indicates the packet error rate, generally, a bandwidth multiplied by $1+PER+PER^2+PER^3+\ldots=1/(1-PER)$ becomes necessary. Therefore, the value of Surplus Bandwidth Allowance which takes into account the bandwidth for retransmission can be obtained by the following formula:

$A$ surp'=$T$ group $(L,\ R\ PHY)/T$ normal $(L,\ R\ PHY)/(1-PER)$, where the value of PER in the above formula may be the packet error rate actually measured by the communication station in the past communication, or may be a fixed value (typical value).

By way of example, FIG. 8 illustrate sequences for exchanging the packets in the case of actually carrying out the communication by using Normal ACK or Group ACK within the TXOP granted by the central control station. FIG. 8(a) is a diagram illustrating the method of using Normal ACK, and FIG. 8(b) is a diagram illustrating the method of using Group ACK. Here, a cycle of an average time period in which a sequence of n packets, Group ACK Request, and Group ACK is transferred through a medium is referred to as an average burst output cycle (T burst).

As a conventional technology, there is "Draft Supplement to REFERENCE FOR Telecommunications and Information Exchange Between Systems—LAN/MAN Specific Requirements—Part 11: Wireless Medium Access Control (MAC) and Physical Layer (PHY) specifications: Medium Access Control (MAC) Enhancements for Quality of Service (QoS), IEEE Std 802.11e/D3.3, 2002."

The network system described above has such a mechanism that the transmission stations only transmit the properties of the streams and the central control station "handles all" the allocation of the transmission rights. Therefore, it is impossible to guarantee that a transmission period having a timing and a length as expected by the transmission station is assigned to each transmission station.

For example, even in the case in which, in order to transmit a traffic with a fixed rate, the transmission station requests the central control station for a transmission period with such property parameters regarding minimum/average/maximum data rates of the stream that the property parameters regarding minimum/average/maximum data rates are of the same value, there is a possibility that the central control station does not grant the transmission right to the transmission station periodically. Because the central control station accepts various requests from many transmission stations at the same time, the central control station usually grants the transmission right nonperiodically when focusing on the transmission right allocation with respect to each stream.

For example, reference numerals 130 to 133 in FIG. 9 show results of various scheduling carried out by the HC. A reference numeral 120 indicates a QoS CF-POLL packet, and a reference numeral 121 indicates the TXOP granted with respect to the transmission station. Thus, even if the HC accepts identical TSPECs from the transmission stations, the HC may grant various TXOPs. The current draft does not define how much observation time is necessary for the central control station to provide the transmission time period corresponding to the requested data rate. Therefore, this depends on implementation. In other words, the method defined in the current draft gives great flexibility with respect to the scheduling of the HC.

The following explains that reliability of the communication path varies according to how to grant the transmission right by the central control station. In FIG. 10, horizontal stripes are drawn in those TXOPs assigned to the polling operations within a certain time period, the polling operations shown in FIG. 9. It is clear from FIG. 10 that the amount of TXOPs, granted in a time period from T1 to T2, of the polling 133 is less than that of each of the polling operations 130, 131, and 132. When considering a case of making the stream flow with a fixed rate, the amount of the transmission right granted in the time period from T1 to T2 in the polling 133 is less than an average amount of the transmission right. Therefore, at a time point T2, a large number of not-yet-transmitted MSDUs (MAC Service Data Unit) remain in a transmission buffer. If the upper layers request to transmit another MSDU 140 at the time point T2, the MSDU 140 is placed in a last of a queue in the transmitting buffer. Therefore, in the case of a polling like the polling 133, it takes a long time until a first packet of the MSDU 140 is transmitted. It is necessary for all the packets to be transmitted to the reception station within the same tolerable transmission delay time. However, in the case in which the time period from T1 to T2 and the time period from T2 to T3 is equal to the tolerable transmission delay time, it is clear that the opportunity of the retransmission of the MSDU 140 in the polling 133 is less than that of each of the polling operations 130 to 132.

Less opportunity of the retransmission indicates that the packet loss rate (PLR) becomes high. Here, the packet loss rate denotes a ratio of packets which are not delivered to the reception station in a time limit (that is, in the tolerable transmission delay time) at an end of repeated retransmission of the packets from the transmission station to the reception station.

Especially in the case of carrying out the communication by using a mechanism in which the transmission station transmits a plurality of packets to the reception station in a burst manner and the reception station notifies, at one time, the transmission station of the acknowledgements with respect to a plurality of the received packets, the frequency of the retransmission is low. Therefore, the packet loss rate is seriously affected by the difference among the polling operations. By frequently notifying the transmission station of the acknowledgements, the difference between the packet loss rates of the polling operations can be reduced. However, in the case in which the acknowledgements are notified too frequently, the efficiency for bandwidth utilization is deteriorated. Because the mechanism of the burst transmission is designed to increase the efficiency for bandwidth utilization, it is preferable that the desired packet loss rate be achieved without deteriorating the efficiency for bandwidth utilization. However, the current draft does not include a guideline concerning how often the transmission station should request the acknowledgements with respect to the reception station.

FIGS. 15 to 18 show concrete examples of various methods of granting the transmission rights by the central control station. Note that, the examples assume that the central control station grants the transmission rights in a 100 TU cycle, 30 MSDUs are inputted in one cycle and are spaced equally, and the maximum tolerable transmission time of each MSDU is 50 TU (here it is assumed that 1 TU=1024 us). The numerals in the TXOPs in the figures indicate the number of packets outputted in the respective TXOPs. In the allocations of TXOPs in Examples 1 to 4, the transmission rights are so granted that 36 packets are outputted in 100 TU.

In order to consider various patterns of the allocation of TXOPs, a variable is used in each allocation of TXOPs. In the allocation of TXOPs shown in FIG. 15 (Example 1), the transmission rights are uniformly granted so that x MDSUs are successively transmitted, and x is a variable here.

In the allocation of TXOPs shown in FIG. 16 (Example 2), the transmission rights are not granted in t TU of 100 TU, and the packets are uniformly transmitted in the rest of 100 TU. Moreover, the transmission rights are so granted that three MSDUs are successively transmitted, and t is a variable here.

In the allocation of TXOPs shown in FIG. 17 (Example 3), the transmission rights are uniformly granted so that three MSDUs are successively transmitted in t TU and six MSDUs are successively transmitted in (100−t) TU. t is a variable here.

In the allocation of TXOPs shown in FIG. 18 (Example 4), the transmission rights are uniformly granted so that eighteen MSDUs are successively transmitted in t TU and three MSDUs are successively transmitted in (100−t) TU. t is a variable here.

FIGS. 19 to 22 show results of simulations of how the packet loss rate changes in the concrete methods of granting the transmission rights by the central control station as illustrated in FIGS. 15 to 18. The horizontal axis of each figure indicates the variable in the allocation of TXOPs. The value of the maximum transmission delay time is also shown in the figures. (Because the maximum tolerable transmission time is 50 TU here, the packet with maximum transmission delay time exceeding 50 TU causes packet loss.) According to these figures, even in the case in which the sum of TXOPs allocated in a certain time period is the same, the maximum transmission delay time and the packet loss rate vary according to the method of granting the transmitting rights.

Each stream application has a tolerable packet loss rate with respect to the communication path. Some applications properly operates when $PLR=10^{-4}$, and others may require $PLR=10^{-8}$. However, the current draft does not include a method in which the transmission station gives, to the central control station, information concerning the packet loss rate desired by the application of the transmission station with respect to the communication path. Therefore, in the communication path, such as a wireless communication path in which errors occur so often, the transmission station needs a method for transmitting to the central control station the information necessary for achieving the desired packet loss rate.

Even in the case in which the video is distorted in the reception station because the transmission rights is allotted by the central control station in improper timing, a user thinks that the transmission station or the reception station is broken. This is not unfavorable for manufacturers of transmission stations and reception stations. In the current draft, the transmission station can transmit not only the information concerning "stream property" but also the information concerning "the polling request". However, this is not enough. Moreover, the current draft does not include a guideline concerning how to set each parameter.

The present invention was made to solve the above problems, and an object of the present invention is to provide a communication management method, a central control station, a communication station, a communication management program, and a computer-readable recording medium storing the communication management program each of which can especially realize, in a communication network in which the packet error rate is comparatively high, the communication path quality requested by the transmission station to the communication path while maintaining flexibility of the scheduling carried out by the central control station.

DISCLOSURE OF INVENTION

In order to achieve the above object, the communication management method of the present invention is so arranged as to include the step of causing a central control station to schedule such that allowance to transmit data is given, as a transmission right, to only one of communication stations in each time period by determining a timing of transmitting data from a communication station that is to transmit the data, to a communication station that is to receive the data, the method including the step of: causing the central control station to carry out the scheduling, by using parameters C, TXOP bound, and T bound, so that a sum of transmission right granted time periods actually granted in a time period {t0, t0+t} is always equal to or more than C·t−TXOP bound where t0 is an arbitrary time point, C is an average ratio of the sum of the transmission right granted time periods allocated, to the communication station that is to transmit the data, by the central control station according to a reference transmission right allocation, and T delay is a maximum tolerable delay time of the data to be transmitted by the communication station that is to transmit the data, C, TXOP bound, and T bound satisfying following formulas:

$$0 \leq T \text{ bound} < T \text{ delay};\quad \text{Formula 1:}$$

$$0 < C < 1; \text{ and} \quad \text{Formula 2:}$$

$$TXOP \text{ bound} = C \cdot T \text{ bound}. \quad \text{Formula 3:}$$

That is, assuming that a certain time point t0 is set as a start point and a reference sum of transmission right granted time periods allocated by the central control station with respect to the communication station is proportional to an elapsed time t starting from t0 (where C is a proportionality coefficient), the transmission right allocation is carried out in such a manner that a sum of transmission right granted time periods allocated from the certain time point t0 according to "the actual transmission right allocation" does not become smaller than a constant value (TXOP bound) which is smaller than an amount (i.e., C·T delay) corresponding to the reference sum of transmission right granted time periods allocated in the tolerable transmission delay time T delay.

FIG. 1 visually shows the definition of TXOP bound. FIG. 1 shows rules which need to be obeyed by all the central control stations. In FIG. 1, t0 indicates the start point of an accumulation. "The reference sum according to a transmission right allocation" is indicated by the straight line 10 in FIG. 1, and is obtained by C·T where T is an arbitrary observation time period. Here, C indicates an average ratio for a period in which transmission right is allotted to the transmission station by the central control station. In the reference transmission right allocation, in addition to a transmission time period necessary for providing a throughput corresponding to the data rate of the application, an extra transmission time period necessary for retransmitting a packet that was failed to be transmitted may be included. As for the extra transmission time period, a protocol may define that (i) the communication station actually measures PER and notifies the central control station, or (ii) a calculation is carried out with a typical PER assumed by the central control station. Here, both are applicable.

Moreover, in FIG. 1, the sum of transmission right granted time periods allocated from the same time point according to "the actual transmission right allocation" is shown by a broken line 11 (broken line B).

In FIG. 1, the central control station carries out the transmission right allocation according to a rule in which a value obtained by subtracting (i) a value of the broken line 11 indicating the sum of transmission right granted time periods allocated from the time point t according to "the reference transmission right allocation obtained by an average data rate or the like of the communication station" from (ii) a value of the straight line 10 indicating the sum of transmission right granted time periods allocated from the same time point t0 according to "the actual transmission right allocation" is always limited according to a constant value (TXOP bound) which is smaller than "the average value of the sum (C·T delay) of transmission right granted time periods allocated in the tolerable transmission delay time according to the reference transmission right allocation".

FIG. 1 illustrates the straight line L indicating that the transmission right granted time periods are defined by (C·t−TXOP bound) where t is a time period elapsed from the time point t0. According to the above arrangement, the broken line B being below the straight line L indicates that the schedule is too "infrequent". The too infrequent schedule indicates that sum of transmission right granted time periods granted by the central control station in the tolerable transmission delay time of an MSDU having been inputted from an upper layer at a certain time point is less than C·T delay−TXOP bound=C·(T delay−T bound), and the opportunity of retransmission of MSDU becomes less.

In contrast, in the case in which the broken line B is not below the straight line L, the number of MSDUs remaining in the transmission buffer of the transmission station is substantially limited within a number of MSDUs to be inputted in the time period T bound=TXOP bound/C. In other words, a time period in which MSDU having been inputted from the upper layer at a certain time point waits in the transmission buffer until the MSDU is transmitted is substantially limited according to T bound=TXOP bound/C. On this account, each MSDU can secure the remaining time (T delay−TXOP bound/C) for retransmission. This makes it possible to carry out highly reliable data transmission.

Note that, in the above arrangement, a protocol may not define a formula concerning the proportionality constant C of "the reference transmission right allocation", and the central control station may calculate an appropriate proportionality constant C by itself. In such a case, the above-described limiting condition concerning the transmission right granting of the central control station may be expressed, for example, as follows: "the transmission right allocation is carried out so that the number of MSDUs remained in the communication station is always limited within the number of MSDUs inputted in a certain time period (T bound) which is shorter than the tolerable transmission delay time T delay". Alternatively, the above-described limiting condition concerning the transmission right granting of the central control station may be expressed as follows: "TXOP necessary for transmitting MSDUs inputted in the time period (t−T bound) have to be allocated to a certain time period {t0, t0+t}".

The above expressions are shown in FIG. 1. That is, FIG. 1 shows a case of focusing on a limit (TXOP limit) of a difference between (i) the sum of transmission right granted time periods at a certain time point and (ii) a reference value, and a case of focusing on a limit (T bound) of a difference between (i) a time point when the sum of transmission right granted time periods exceeds a certain value and (ii) the reference value.

The value of the tolerable transmission delay time T delay with respect to data transmitted by the communication station may be previously set in the central control station, or may be notified to the central control station by the communication station before the communication station starts transmitting data.

If two of the values of the parameters C, TXOP bound, and T bound are determined, the rest of the values is determined according to Formula 3. All of or a part of the parameters may be arbitrarily determined by the central control station, or may be determined by the communication station in reference to desired values obtained from the communication station before the communication station starts transmitting data. In the latter case, it becomes easy to satisfy requests of each communication station. Moreover, it is possible to determine the values according to a protocol. All of or a part of the parameters may be fixed values.

In the case in which, according to information such as TSPEC transmitted from the communication station, the central control station can find out the tolerable maximum value (Maximum Service Interval, T max) of a wait time of transmission to be carried out by the communication station, the value of T bound or TXOP bound may be determined as T max or as a value of a function of T max.

The central control station may determine the concrete value of T bound or TXOP bound according to "information concerning which to use, Normal ACK or Group ACK" obtained from the communication station.

In the case in which the schedule satisfying the above-described limiting condition cannot be found, (i) the transmission may be rejected, or (ii) if the communication station agrees with increasing the value of T bound or TXOP bound, the scheduling may be carried out again with T bound or TXOP bound of a larger value.

The above arrangement may use the communication method conforming to IEEE Std 802.11e/D3.3 2000.

The method of transmission may be a normal transmission (Normal ACK is used as the acknowledgement transmitted from the reception station) or the burst transmission (Group ACK is used as the acknowledgement transmitted from the reception station).

Thus, while maintaining the flexibility of the scheduling carried out by the central control station, it is possible to exactly show, to the communication stations, the minimal requirement of transmission right granted time periods allocated with respect to the communication stations. This enables the calculation of the maximum burst length required for achieving a desired packet loss rate of the communication station, especially when the communication station carries out communication by using the burst transmission. Therefore, the communication station can achieve the desired packet loss rate.

Moreover, the communication management method of the present invention is so arranged as to include the step of causing a central control station to schedule such that allowance to transmit data is given, as a transmission right, to only one of communication stations in each time period by determining a timing of transmitting data from a communication station that is to transmit the data, to a communication station that is to receive the data, the method including the step of: causing the central control station to carry out the scheduling, by using parameters C, TXOP1 bound, T1 bound, TXOP2 bound, and T2 bound, so that a sum of transmission right granted time periods actually granted in a time period {t0, t0+t} is always equal to or more than C·t−TXOP1 bound and equal to or less than C·t+TXOP2 bound where t0 is an arbitrary time point, C is an average ratio of the sum of the transmission right granted time periods allocated, to the communication station that is to transmit the data, by the central control station according to a reference transmission right allocation, and T delay is a maximum tolerable delay time of the data to be transmitted by the communication station that is to transmit the data, C, TXOP1 bound, T1 bound, TXOP2 bound, and T2 bound satisfying the following formulas:

$$0 \leq T1 \text{ bound} < T \text{ delay}, 0 \leq T2 \text{ bound}; \quad \text{Formula 4:}$$

$$0 < C < 1; \text{ and} \quad \text{Formula 5:}$$

$$TXOP1 \text{ bound} = C \cdot T1 \text{ bound}, \quad \text{Formula 6:}$$

$$TXOP2 \text{ bound} = C \cdot T2 \text{ bound}.$$

In the above arrangement, the limitation by {C, TXOP1 bound, T1 bound} is the same as before, and the limitation by {C, TXOP2 bound, T2 bound} is further added. The former is the limitation with respect to an infrequent schedule, and the latter is the limitation with respect to a frequent schedule. Even in the case in which the schedule of a certain communication station is very frequent, that communication station can carry out transmission without any problem. However, by providing the upper limit of the transmission right granted time period with respect to a specific communication station, it becomes possible to leave more opportunity for other communication stations to participate.

Moreover, in addition to the above arrangement, the communication management method of the present invention is so arranged that a communication station transmitting a data packet under a control of the central control station previously reserves, to the control station, information concerning a traffic property of the data packet, and the central control station uses the information when determining the reference transmission right allocation, the information given from each communication station.

With the above arrangement, it becomes possible to schedule according to a request from the communication station.

Moreover, in addition to the above arrangement, the communication management method of the present invention is so arranged that the central control station uses a fixed value as a concrete value of TXOP bound or T bound.

With the above arrangement, it becomes possible to schedule with a simple arrangement.

Moreover, in addition to the above arrangement, the communication management method of the present invention is so arranged as to include the step of causing the central control station to concretely determine TXOP bound or T bound according to information given from a communication station side.

The allowable packet loss rate with respect to the communication path varies depending on each stream application. It is preferable that the value of TXOP bound (or T bound) be small for the stream requesting a low packet loss rate, but the value of TXOP bound (or T bound) may be large for the stream in a packet loss rate large in some degree is tolerable. Needless to say, better flexibility of the scheduling can be obtained in the case in which the value of TXOP bound (or T bound) is large.

With the above arrangement, in the case in which the information of the requirement concerning the quality of the communication path can be obtained from the communication station, the value of TXOP bound (or T bound) is set for each stream. In this way, while satisfying the communication path quality requested to the communication path by each stream, the flexibility of the scheduling can be maximized.

Thus, in addition to the effects obtained in the above arrangements, it becomes possible to schedule according to the requests from the communication stations.

Moreover, in addition to the above arrangement, the communication management method of the present invention is so arranged as to include the step of causing the central control station to concretely determine TXOP bound or T bound as a function of "a maximum time interval between two successive times at which polling is desired" T max requested from a communication station side.

The current TSPEC includes a parameter called Maximum Service Interval T max which expresses the maximum time interval between two successive times at which polling is desired". Therefore, it may be rational to set, as the value of TXOP bound, an average amount of transmission right allocation time periods granted in the Maximum Service Interval, that is, C·T max. Moreover, except that TXOP bound is set to be exactly equal to C·T max, it is also possible to determine TXOP bound by referring to T max. Similarly, except that T bound is set to be exactly equal to T max, it is also possible to determine T bound by referring to T max.

With the above arrangement, without increasing the number of parameters of TSPEC, the communication station can give, to the central control station, information which is for determining the concrete value of TXOP bound or T bound.

Moreover, in addition to the above arrangement, the communication management method of the present invention is so arranged as to include the step of causing the central control station to concretely determine that TXOP bound or T bound is a function of a smallest value among values of T max of a plurality of streams to be transmitted from the communication station side, where T max is a maximum time interval between two successive times at which polling is desired.

In the case in which the communication station has a plurality of streams, it is believed that each stream has a requirement concerning "the maximum time interval between two successive times at which polling is desired". It is rational to determine the value of TXOP bound (or T bound) as a function of a smallest value in the maximum values.

Moreover, with the above arrangement, without increasing the number of parameters of TSPEC, the communication station can give, to the central control station, information which is for determining the concrete value of TXOP bound or T bound.

Moreover, in addition to the above arrangement, the communication management method of the present invention is so arranged as to include the step of causing the central control station to concretely determine that TXOP bound or T bound is a function of T delay where T delay is a maximum tolerable delay time of the data to be transmitted by the communication station.

The current TSPEC includes a parameter called Delay Bound (T delay) which expresses "the tolerable maximum delay time". Therefore, it may be rational to set TXOP bound to an average amount of transmission right allocation time periods granted in a time corresponding to a half or a quarter of Delay Bound, that is, C·(T delay/2) or C·(T delay/4).

Moreover, with the above arrangement, without increasing the number of parameters of TSPEC, the communication station can give, to the central control station, information which is for determining the concrete value of TXOP bound or T bound.

Moreover, in addition to the above arrangement, the communication management method of the present invention is so arranged as to include the step of causing the central control station to concretely determine that TXOP bound or T bound is a function of a smallest value among values of T delay of a plurality of streams to be transmitted by the communication station, where delay is a maximum tolerable delay time of the data to be transmitted by the communication station.

In the case in which the communication station has a plurality of streams, it is believed that each stream has a requirement concerning "the tolerable maximum delay time". It makes sense to determine the value of TXOP bound (or T bound) as a function of a smallest value in the tolerable maximum delay times.

Moreover, with the above arrangement, without increasing the number of parameters of TSPEC, the communication station can give, to the central control station, information which is for determining the concrete value of TXOP bound or T bound.

Moreover, in addition to the above arrangement, the communication management method of the present invention is so arranged that transmission is burst transmission.

As described above, in the case in which the communication station carries out communication by using the burst transmission (Group ACK), frequency of returning the acknowledgement is low. Therefore, as a means of securing a number of times retransmission of each packet can be carried out, the limiting condition according to the present invention becomes more important, the limiting condition concerning the transmission right granting of the central control station with respect to the communication station.

Therefore, it is possible to enjoy the benefit of the limiting condition according to the present invention, the limiting condition concerning the transmission right granting of the central control station with respect to the communication station.

Moreover, in addition to the above arrangement, the communication management method of the present invention is so arranged as to include the step of causing the central control station to concretely determine TXOP bound or T bound according to "information concerning which to use, Normal ACK or Group ACK" given from the communication station.

As described above, in the case of using Group ACK, the frequency of returning the acknowledgement is low. Therefore, a time period for retransmitting a packet a certain times becomes longer than that in the case of using Normal ACK. In other words, in the case in which the communication station carries out communication by using Normal ACK, there is a high possibility that the required number of times retransmission can be carried out can be secured in the remaining time (T delay−T bound), even when a value close to the tolerable transmission delay time T delay is selected as the value of T bound. However, in the case in which the communication station carries out communication by using Group ACK, there is a high possibility that the required number of times retransmission can be carried out cannot be secured in the above time if the value of T bound is not small and the time (T delay−T bound) is not long. Because of the above reasons, it is preferable that the central control station determine the concrete value of TXOP bound or T bound according to information concerning which to use, Normal ACK or Group ACK, for transmission to be carried out by the communication station.

With the above arrangement, it becomes possible to determine the value of TXOP bound or T bound suitable for the method of transmitting ACK by the communication station.

Moreover, the communication management method of the present invention is so arranged as to include the step of causing a central control station to judge, according to the formulas as set forth in claims 1 to 13, whether or not a new stream is able to be accepted.

That is, in a state in which the central control station has already carried out polling for several streams, and in the case in which the central control station receives, from the communication station, a request concerning polling for a new stream, (i) the request concerning polling for the new stream is accepted in the case in which the transmission right can be to allotted to all the streams according to the above calculation, and (ii) the request concerning polling for the new stream is rejected in the case in which the transmission right cannot be allotted to all the streams according to the above calculation.

With the above arrangement, it becomes possible to appropriately judge whether or not the new stream is accepted.

Moreover, in the communication management method of the present invention is so arranged that the communication station is in a network adopting the above method; and if the communication station judges that the central control station does not satisfy the method, the communication station notifies a user of a fact that "the transmission right granting carried out by the central control station does not satisfy minimum requirement" or "due to the central control station, problems occur when transmitting a stream data".

In the communication method discussed here, three stations, that is, the central control station, the transmission station, and the reception station are mutually related. Therefore, in the case in which a video is frequently distorted in the reception station, it is difficult for users to correctly find out which station is broken. Moreover, in the case in which the video is distorted in the reception station due to the improper timing of the transmission right allocation carried out by the central control station, the uses viscerally feels that the transmission station or the reception station is broken.

With the above arrangement, in a state in which the video is frequently distorted, it becomes possible to notify users that the video is frequently distorted because of the central control station, not because of the transmission station or the reception station.

Moreover, in addition to the above arrangement, the communication management method of the present invention is so arranged as to include the step of: carrying out communication by using a mechanism in which: (i) in a case in which a central control station uses the method as set forth in any one of claims 1 to 15, a communication station obtains n by a following formula: using a packet error rate PER and a packet loss rate PLR of a communication path:

$$n=\text{ceiling } \{\log(PLR)/\log(PER)\},$$

where n is a desirable maximum number of times transmission is able to be carried out, (ii) an average burst output cycle (T burst) is defined as a certain time period equal to or less than a time period T burstmax obtained by dividing, by n, a time period obtained by a formula (an tolerable transmission delay time−TXOP bound/C), and (iii) a plurality of packets needed to be outputted in T burst are transmitted in a burst manner, and a reception station gives, to a communication station, acknowledgements with respect to the packets at once.

FIG. 2 visually shows a process for obtaining the maximum value of T burst (T burstmax). FIG. 2 shows a method of determining the burst length when the communication station carries out the burst transmission.

In an embodiment of the present invention, a protocol, a recommendation for communication, or the like defines that the wait time elapsed until the transmission of MSDU is limited according to T bound=TXOP bound/C, the wait time occurring because of variations of transmission time periods granted by the polling of the central control station. In such case, and in the case of carrying out the communication by using a mechanism in which the transmission station transmits a plurality of packets in a burst manner and the reception station returns a plurality of the acknowledgements with respect to the packets at once, it is possible to give a guideline concerning the frequency of the transmission station's requesting the reception station to return the acknowledgement. Then, according to the formula shown in FIG. 2 for obtaining the value of T burstmax, it becomes possible to secure substantially n times, that is, the maximum number of times MSDU inputted in an arbitrary phase can be transmitted. In this way, a desired packet loss rate is substantially achieved.

Therefore, with the above arrangement, it becomes possible to estimate the maximum value of the burst length for substantially achieving the desired packet loss rate in the case of transmitting the packets in a burst manner.

Moreover, in addition to the above arrangement, the communication management method of the present invention is so arranged as to include the step of: carrying out communication by using a mechanism in which: (i) in a case in which a central control station uses the method as set forth in any one of claims 1 to 15, a communication station obtains n by a following formula using a packet error rate PER and a packet loss rate PLR of a communication path:

$$n=\text{ceiling } \{\log(PLR)/\log(PER)\},$$

where n is a desirable maximum number of times transmission is able to be carried out, (ii) an average burst output cycle (T burst) is defined as a certain time period equal to or less than a time period T burstmax obtained by dividing, by n, a time period obtained by a formula (an tolerable transmission delay time−TXOP bound/C), and (iii) a plurality of packets needed to be outputted in T burst are transmitted in a burst manner, and a reception station notifies to the communication station, acknowledgements with respect to the packets at once.

FIG. 2 also visually shows a process for obtaining the maximum value of T burst (T burstmax) of this case.

Therefore, with the above arrangement, it becomes possible to estimate the maximum value of the burst length for substantially achieving the desired packet loss rate in the case of transmitting the packets in a burst manner.

Moreover, in addition to the above arrangement, the communication management method of the present invention is so arranged as to include the step of causing a central control station to schedule such that allowance to transmit data is given, as a transmission right, to only one of communication stations in each time period by determining a timing of transmitting data from a communication station that is to transmit the data, to a communication station that is to receive the data, the method comprising the step of: causing said one communication station to derive n by a following formula using a packet error rate PER and a packet loss rate of a communication path:

$$n=\text{ceiling } \{\log(PLR)/\log(PER)\}$$

where n is a desirable maximum number of times transmission is able to be carried out; and notifying the central control station that a time period equal to or less than a time period obtained by dividing, by n, a value of an tolerable transmission delay time T delay is "a maximum time interval between two successive times at which polling is desired"

For example, in the case in which the network protocol does not tell the value of TXOP bound or T bound, there are no other choice but to expect a near performance according to the above formula.

With the above arrangement, in the case of considering the tolerable transmission delay time in an arbitrary phase, n-time polling operations are surely carried out within the time. In the case in which the variations of the transmission time periods granted by the polling operations are not large, it becomes possible to secure that the maximum number of times MSDU inputted in an arbitrary phase can be transmitted is at least n times. Therefore, it is possible to expect that the desired packet loss rate is substantially achieved.

Therefore, with the above arrangement, it becomes possible to estimate the maximum value of the burst length for substantially achieving the desired packet loss rate in the case of transmitting the packets in a burst manner.

The communication station may be so structured as to (i) use, as the concrete value of PER, a value actually measured in past communication by the communication station itself, or (ii) use a fixed value (typical value).

Moreover, in addition to the above arrangement, the communication management method of the present invention is so arranged as to include the step of carrying out communication by using a mechanism in which (i) the communication stations calculate a number of packets needed to be outputted in the maximum time interval between two successive times at which polling is desired, (ii) the packets are transmitted in a burst manner, and (iii) a reception station gives, to the communication station, acknowledgements with respect to a plurality of the received packets at once.

As described above, in the case in which the variations of the transmission time periods granted by the polling operations are not large, it becomes possible to secure that the maximum number of times MSDU inputted in an arbitrary phase can be transmitted is at least n times. The present arrangement gives a guideline concerning the frequency of requesting the acknowledgement from the communication station with respect to the reception station in the case of carrying out the communication by using a mechanism in which a plurality of packets are transmitted in a burst manner and the reception station returns to the communication station a plurality of the acknowledgements with respect to the received packets at once.

Therefore, with the above arrangement, even in the case in which a protocol does not tell the value of TXOP bound or T bound, the burst transmission of the packets can be performed, substantially achieving the desired packet loss rate.

Moreover, in addition to the above arrangement, the communication management method of the present invention is so arranged that the communication stations use, as a concrete value of the packet error rate PER, a value of PER actually measured by each communication station.

Therefore, with the above arrangement, it is possible to estimate, in a practical manner, the necessary number of times retransmission can be carried out.

Moreover, in addition to the above arrangement, the communication management method of the present invention is so arranged that the communication stations use a fixed value as a concrete value of the packet error rate PER.

Therefore, with the above arrangement, it becomes possible to carry out implementation with a simple arrangement.

Moreover, in addition to the above arrangement, the communication management method of the present invention is so arranged as to be adopted especially in a wireless network.

Moreover, in addition to the above arrangement, the communication management method of the present invention is so arranged as to be adopted especially in a power line network.

Moreover, in addition to the above arrangement, the communication management method of the present invention is so arranged as to use a communication method conforming to IEEE Std 802.11e/D3.3 2002.

With the above arrangement, the communication management method of the present invention can be applied to IEEE Std 802.11e/D3.3 2002.

Moreover, the central control station of the present invention is so arranged as to manage communication according to the above method.

Moreover, the communication station of the present invention is so arranged as to carry out communication according to the above method.

Moreover, the communication management program of the present invention is so arranged as to cause a computer to execute the steps of the above method.

Moreover, the computer-readable recording medium, of the present invention, storing a communication management program is so arranged as to store the above communication management program.

Additional objects, features, and strengths of the present invention will be made clear by the description below. Further, the advantages of the present invention will be evident from the following explanation in reference to the drawings.

BRIEF DESCRIPTION OF DRAWINGS

FIG. 7 is a diagram showing a relationship between a physical rate and N DBPS.

FIGS. 8(a) and 8(b) are diagrams showing a method of transmitting packets in TXOPs.

BEST MODE FOR CARRYING OUT THE INVENTION

Figure 1:
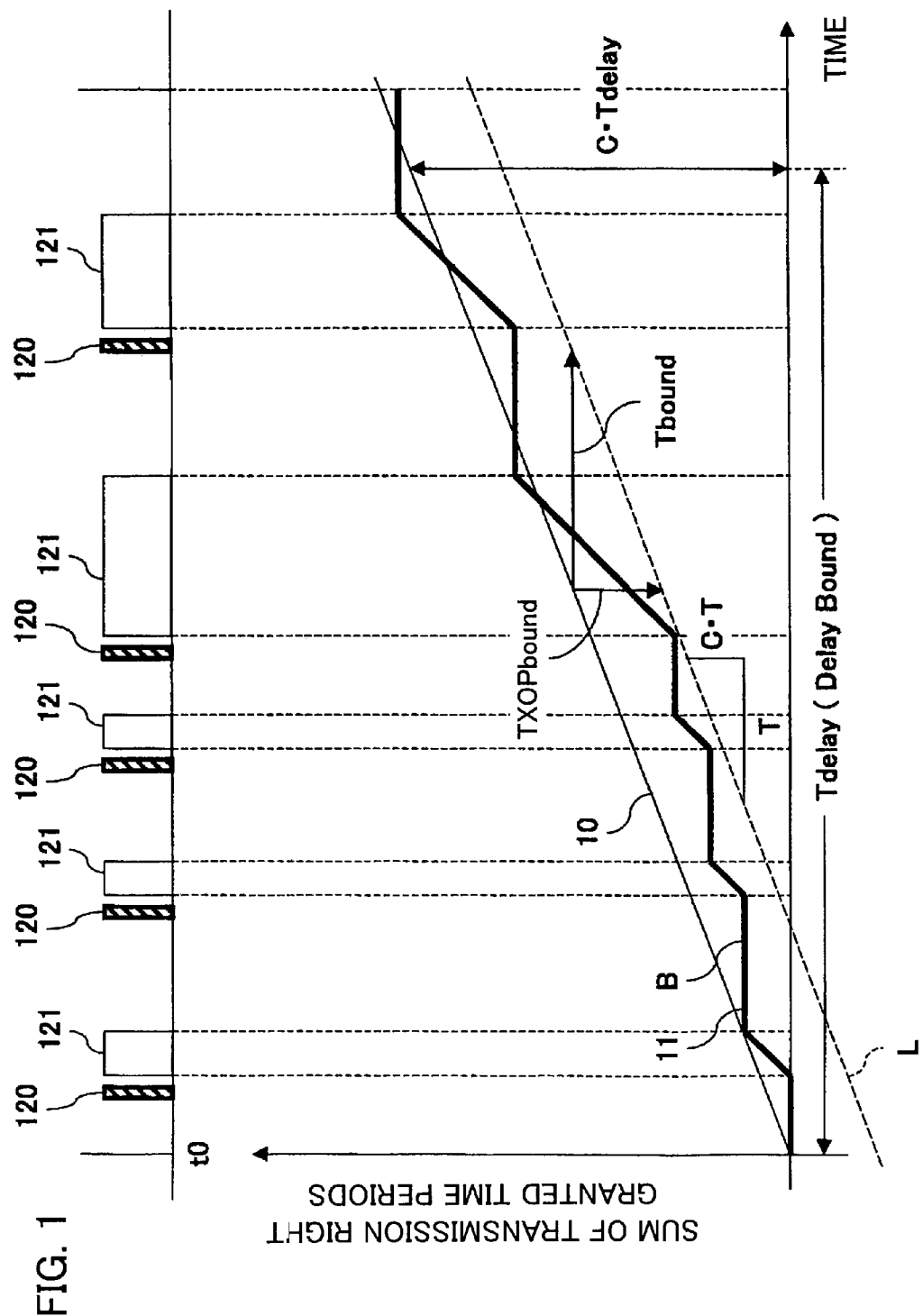
FIG. 1 is a diagram showing rules which need to be obeyed by all the central control stations in a network system in accordance with one embodiment of the present invention.

The following explains one embodiment of the present invention in reference to FIGS. 1 to 8.

The explanation having been made in reference to FIGS. 5 to 8 is applicable to the present embodiment, and is omitted here.

The following describes an example in which the present invention is applied to IEEE Std 802.11e/D3.3. For example, the following describes an example in which the flowing two points of the present invention are applied to IEEE Std 802.11e/D3.3 as definitions or recommendations.

Point 1

A value of "reference ratio C for transmission right allotment is calculated according to TSPEC in the following manner. The transmission right is granted by a central control station HC to a communication station that is going to transmit data. In the present calculation, a typical value (10% in the physical layer conforming to IEEE 802.11a) is used as a value of PER (Packet Error Rate).

That is, used as the parameters of TSPEC are Mean Data Rate (R mean), Minimum PHY Rate (R PHY_MIN), Nominal MSDU Size (B nom), and Surplus Bandwidth Allowance (A surp).

In the case of Normal ACK, a time period necessary for transmitting one packet is obtained by the following formula:

T normal (B nom, R PHY_MIN).

In the case of considering the value of Surplus Bandwidth Allowance, an average time period necessary for transmitting one packet is obtained by the following formula:

A surp·T normal (B nom, R PHY_MIN).

In the case of considering an extra bandwidth necessary for retransmitting the packet, an average time period necessary for transmitting one packet is obtained by the following formula:

$T$ avg=$A$ surp·$T$ normal ($B$ nom, $R$ PHY_MIN)/(1−PER).

If all the time periods are allocated, an achievable data rate is obtained by the following formula:

$R1$=$B$ nom/$T$ avg.

Therefore, an average ratio for a period in which transmission right is allotted with respect to the stream is defined as follows:

$C$=$R$ mean/$R1$.

Point 2

The central control station HC carries out the transmission right allocation so that a value, obtained by subtracting (i) a sum of transmission right granted time periods accumulated from a certain time point according to an "actual transmission right allocation" from (ii) a sum of transmission right granted time periods expected to accumulate from the same time point according to the "reference ratio C for transmission right allotment", is always limited within C·Tmax. Here, Tmax indicates Maximum Service Interval as described below.

Based on the above two points, considered is a case in which a communication station requests polling with respect to a central control station so that an MPEG2-TS moving image (video) application having the following requirements is transferred. Data rate (fixed) of the application: R (Appli) Tolerable maximum delay time of the application: T delay (Appli) Jitter limit of the application: T jitter (Appli) Transmission physical rate suitable for the application: R PHY (Appli) Minimum observation time period for allowing the central control station to cut a communication path in the case in which the traffic cannot be detected: T inact (Appli) Packet loss rate: PLR.

It is assumed that the present communication station carries out communication by using Group ACK for improving the efficiency for bandwidth utilization. Moreover, in order to improve the efficiency for bandwidth utilization, transmission is carried out so that one packet includes 10 MPEG2-TS (188 bytes).

The following shows calculation examples of TSPEC which is set by the communication station for the central control station in this case. The parameters of TSPEC are as follows:

Mean Data Rate (R mean);
Min Data Rate (R min);
Peak Data Rate (R max);
Maximum Burst Size (B burst);
Inactivity Interval (T inact);
Minimum PHY Rate (R PHY_MIN);
Delay Bound (T delay);
Nominal MSDU Size (B nom);
Maximum MSDU Size (B max);
Minimum Service Interval (T min);
Maximum Service Interval (T max);
Surplus Bandwidth Allowance (A surp).

The following describes the calculation examples.

Information of the application can be directly applied to Min/Mean/Peak Data Rates, Inactivity Interval, and Minimum PHY Rate. That is, those parameters are obtained by the following formulas:

$R$ mean=$R$ min=$R$ max=$R$ (Appli);

$T$ inact=$T$ inact (Appli); and $R$ PHY_MIN=$R$ PHY (Appli).

Moreover, because a fixed rate is used as the rate of the application, Max Burst Size is unspecified (0) because it is a parameter for a variable rate traffic. In addition, Minimum Service Interval is unspecified (0) because it is a parameter for power saving.

The value of the tolerable transmission delay time (Delay Bound) with respect to the MAC layer is set to be smaller than both a value T delay (Appli), requested by the application, of the maximum transmission delay time and a value T jitter (Appli), requested by the application, of the jitter limit. That is, T delay is as follows:

$T$ delay≦min {$T$ delay (Appli), $T$ jitter (Appli)}.

Because the bit size of a payload (B payload) included in one packet is fixed (188×10×8 bits), the value of Nominal MSDU Size is a value obtained by adding overheads of the LLC layer and the upper layers to the value of B payload. That is, B nom is obtained by the following formula:

$$B\ nom = B\ payload + (\text{Overheads of the } LLC \text{ layer and the upper layers}).$$

Controversial two remaining parameters of TSPEC are Maximum Service Interval (T max) and Surplus Bandwidth Allowance (A surp).

First, as T max, the communication station can basically select any value smaller than T delay. By way of example, it may be appropriate to request the central control station to give, as an initial value of T max, a value obtained by the following formula:

$$T\max = T\operatorname{delay}/n,$$

where n is a desirable maximum number of times one packet can be transmitted.

According to Point 2, it is possible to expect that the HC carries out more uniform polling operations by setting the value of T max to be small. However, the smaller the value of T max of the stream is, the more difficult the scheduling carried out by the HC becomes. Therefore, there is a high possibility that the HC may reject to receive the small value of T max. The value of T max to use actually is determined by the negotiation between the communication station and the HC.

Figure 2:
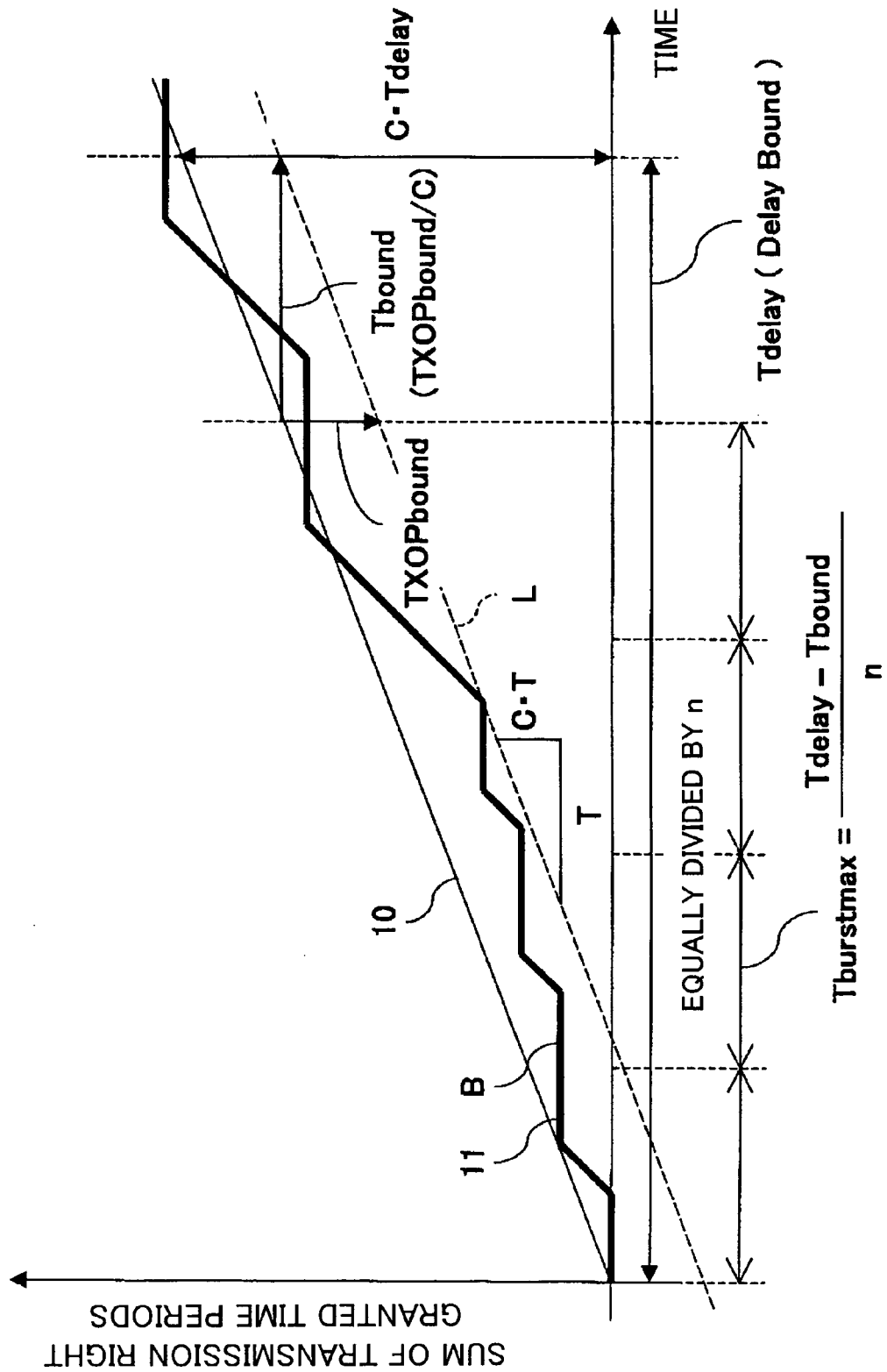
FIG. 2 is a diagram showing a method of determining a burst length when a transmission station carries out a burst transmission in the network system in accordance with the one embodiment of the present invention.

Once the value of T max is determined, it is possible to obtain the maximum value of an average burst output cycle T burst. First, according to Point 2, it is assumed that TXOP bound=C·T max. Therefore, TXOP bound/C=T max. A maximum value T burstmax of the average burst output cycle T burst necessary for achieving the desired packet loss rate in FIG. 2 is obtained by the following formula:

$$T\ \text{burstmax} = (T\operatorname{delay} - T\max)/n.$$

Moreover, n is obtained by the following formula:

$$n = \text{ceiling}\{\log(PLR)/\log(PER)\},$$

where ceiling (x) is a maximum integer not more than x. In the above calculation, the value of PER may be a value actually measured in past communication, or may be a typical value (in the physical layer conforming to 802.11a, the typical value of PER is 0.1). It is clear from the above calculation that, by selecting, as the average burst output cycle T burst, any value less than T burstmax, the communication station can achieve the desired communication quality while using the mechanism of the burst transmission. If best efficiency for bandwidth utilization is desired, T burst is set to be equal to T burstmax.

Once the average burst output cycle T burst is determined, the burst length N can be determined in the following manner. First, the number of bits of MPEG2-TS inputted from the upper layers within T burst can be obtained by the following formula:

$$R\ \text{mean} \times T\ \text{burst}.$$

Therefore, the average number of packets which should be outputted within T burst is obtained by the following formula:

$$R\ \text{mean} \times T\ \text{burst}/B\ \text{nom},$$

where B nom is Nominal MSDU Size. However, the above value does not include the number of extra packets to be transferred through retransmission. Considering the bandwidth for retransmission, an average number of packets N avg which should be outputted within T burst can be estimated by the following formula:

$$N\ \text{avg} = R\ \text{mean} \times T\ \text{burst}/B\ \text{nom}/(1 - PER).$$

From this, packets of a number obtained by the following formula should be transmitted in a burst manner by using Group ACK:

$$N = \text{floor}\{N\ \text{avg}\},$$

where floor (x) is a minimum integer not less than x.

Once the burst length N is determined, it becomes possible to carry out the above calculation, that is, the calculation of the average time period necessary for transmitting one packet by using Group ACK. Therefore, it is possible to determine the value of Surplus Bandwidth Allowance (A surp).

On the other hand, the central control station (i) calculates the value of "the reference ratio C for transmission right allotment" in the above-described way, (ii) grants the transmission rights so that the total of TXOPs allocated in a time period T is averagely C·T, and (iii) carry out the transmission right allocation so that a difference (Diff) between (a) the sum of transmission right granted time periods accumulated from a certain time point and (b) the ideal value is always limited within C·T max (this condition is referred to as communication control condition).

Figure 11:
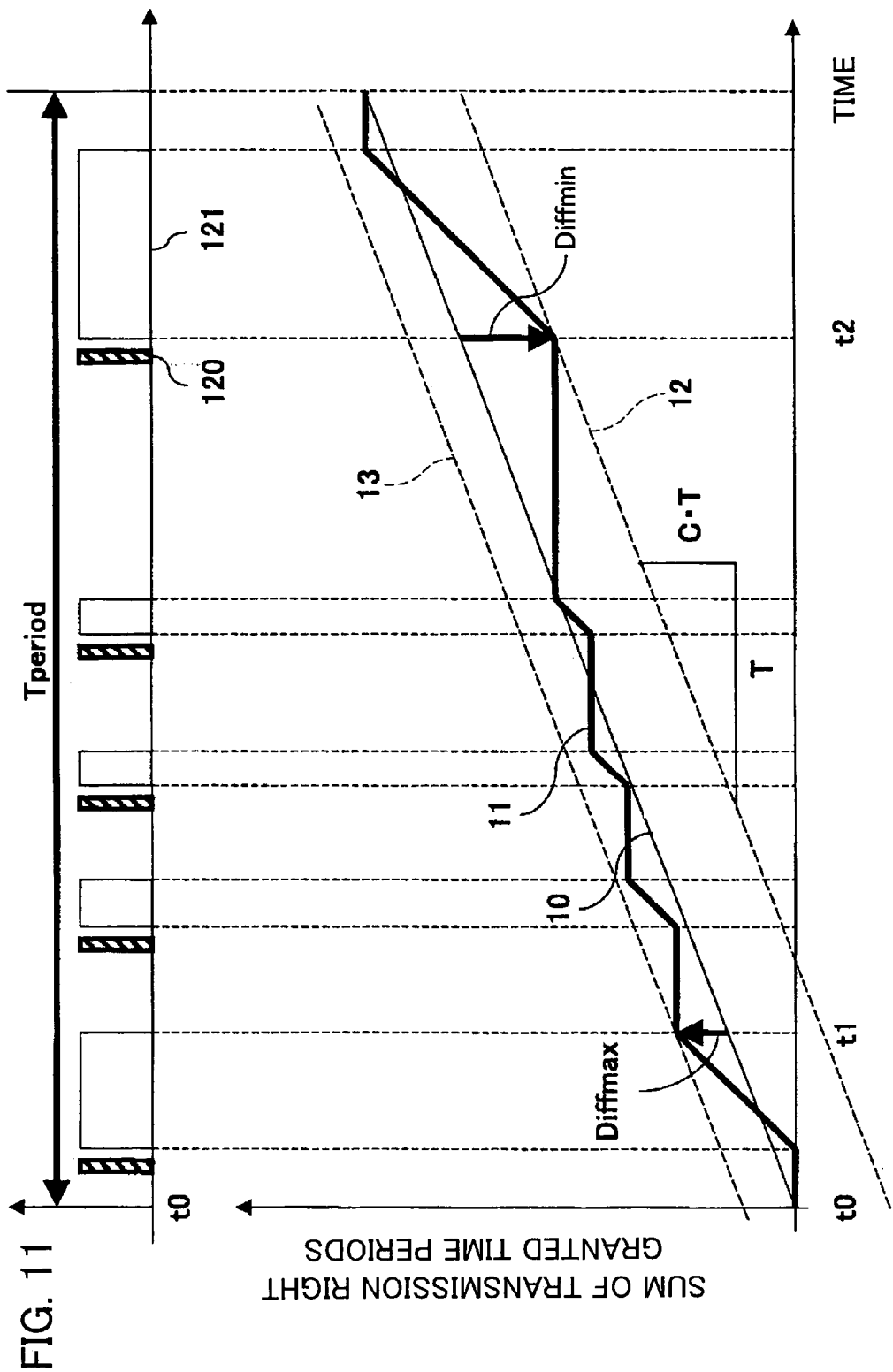
FIG. 11 is a diagram showing one example of the transmission right allocations periodically carried out by the central control station.

Generally, the central control station periodically carries out the transmission right allocation. FIG. 11 shows one concrete example of the transmission right allocations periodically carried out by the central control station. In the example, T period indicates a period in which the central control station carries out the transmission right allocation, and C indicates the reference allocation rate of transmission rights with respect to a certain communication station. In this case, the central control station grants the transmission right of C·T period to the communication station within one T period.

Then, the central control station (i) divides the transmission right of C·T period into a plurality of TXOPs, (ii) allocates the TXOPs in the T period, and (iii) checks whether or not the placement of TXOPs satisfies the communication control condition. The communication control condition requires that the shortage obtained by subtracting (i) the sum of transmission right granted time periods accumulated from a certain time point from (ii) the reference value be always limited according to TXOP bound. This can easily be checked in the following manner.

That is, in the case in which the central control station divides the transmission right of C·T period into TXOPs placed as shown in FIG. 11, (i) selects a certain time point t0, (ii) draw a straight line 10 indicating "an average sum of transmission right granted time periods accumulated from a time point t0 according to the reference transmission right allocation" and a broken line 11 indicating "a sum of transmission right granted time periods accumulated from a time point t0 and allocated according to the actual transmission right allocation", (iii) obtain the maximum and minimum values of the difference between the broken line 11 and the straight line 10, and (iv) check whether or not the difference between the maximum and minimum values is equal to or less than TXOP bound. In this way, it is possible to check whether or not the communication control condition is satisfied. Here, the difference between the broken line 11 and the straight line 10 is obtained by subtracting the value of the straight line 10 from the value of the broken line 11. Therefore, the maximum value of the difference is 0 or more, and the minimum value of the difference is 0 or less.

Figure 12:
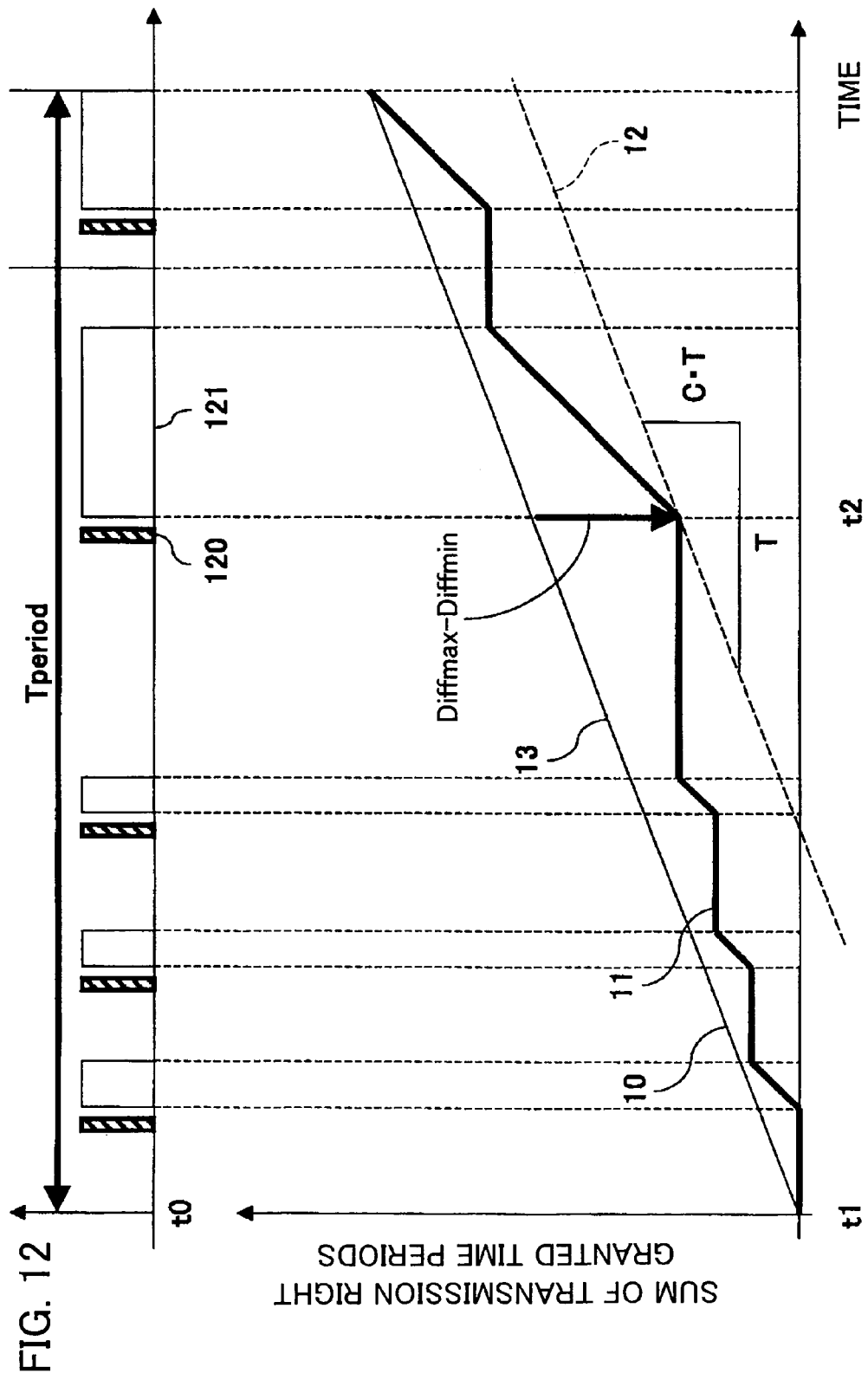
FIG. 12 is a diagram showing one example of the transmission right allocations periodically carried out by the central control station.

In FIG. 11, the difference between the broken line 11 and the straight line 10 becomes maximum (Diff max) at the time point t1, and becomes minimum (Diff min) at the time point t2. Therefore, it is possible to judge that the communication control condition is satisfied if Diff max−Diff min≦TXOP bound, but is not satisfied if not. This is because it is obvious from the FIG. 11 that, in the case in which the starting point of the accumulation is the time point t1, how much the sum of transmission right granted time periods is short of the ideal value can be calculated by the maximum value Diff max−Diff min. FIG. 12 is a graph in the case in which the stating point of the accumulation is the time point t1.

As it is clear from the above description, it is also possible to say that the value of Diff max−Diff min is a difference in a y-axis direction on the graph between (i) the straight line 12 being tangent to the broken line 11 from below and having an inclination C and (ii) the straight line 13 being tangent to the broken line 11 from above and having the inclination C.

Figure 13:
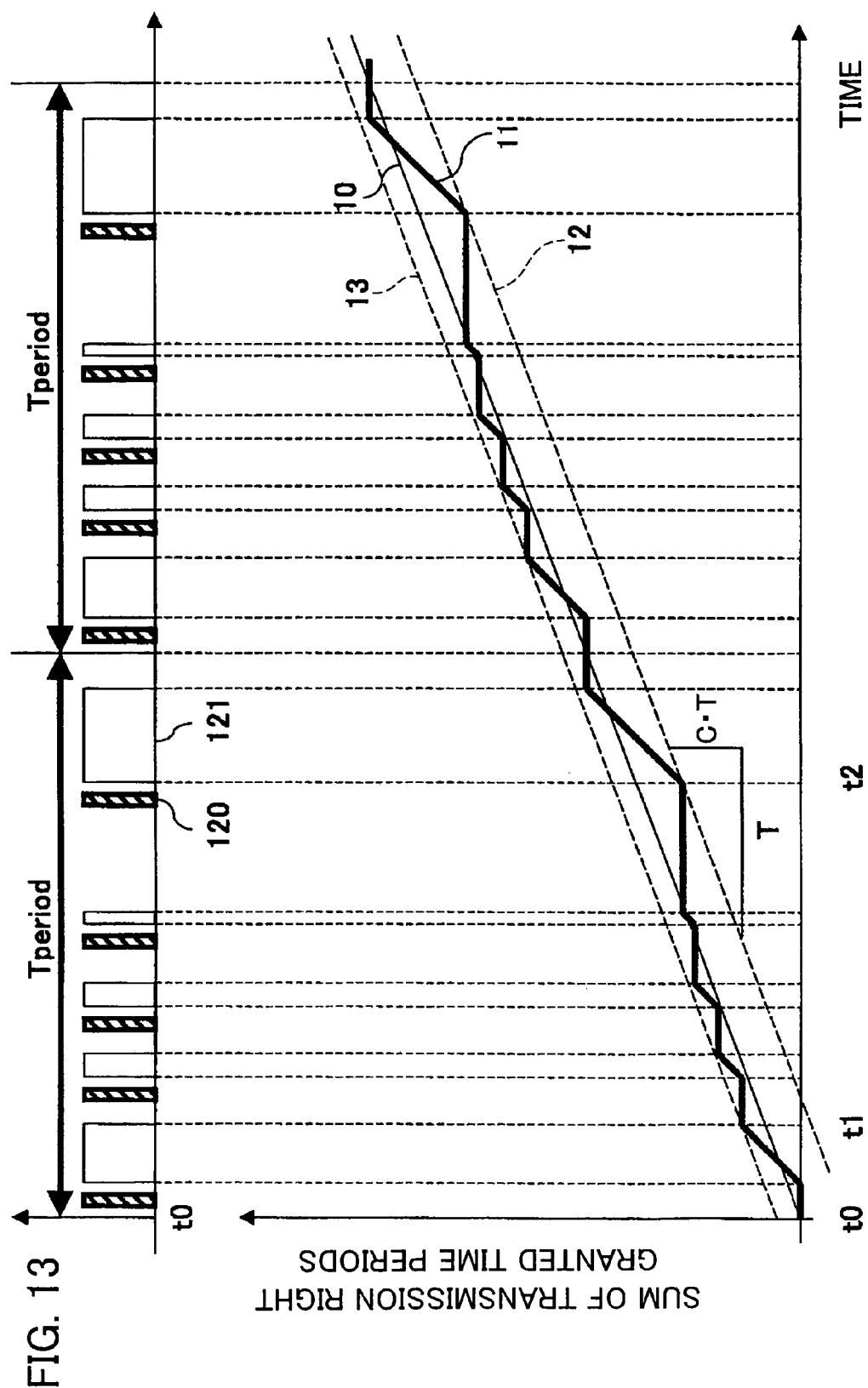
FIG. 13 is a diagram showing one example of the transmission right allocations periodically carried out by the central control station.

FIG. 13 is a graph showing the transmission right allocation in two periods. It is clear from FIG. 13 that it is possible to judge, according to the information of one period, whether or not the communication control condition is satisfied in the case in which the central control station periodically carries out the transmission right allocation.

Figure 14:
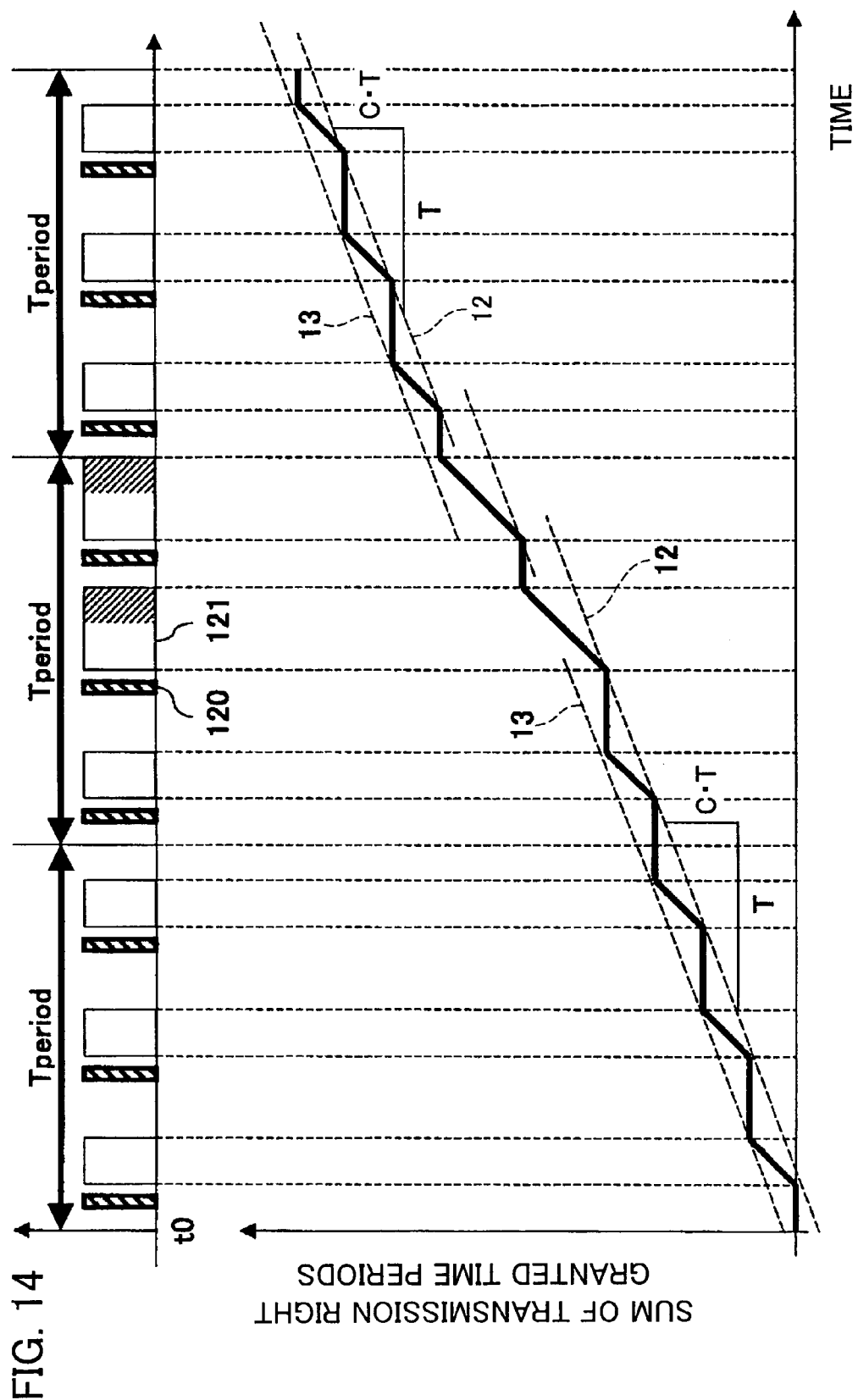
FIG. 14 is a diagram showing one example of the transmission right allocations additionally carried out by the central control station.
Figure 15:
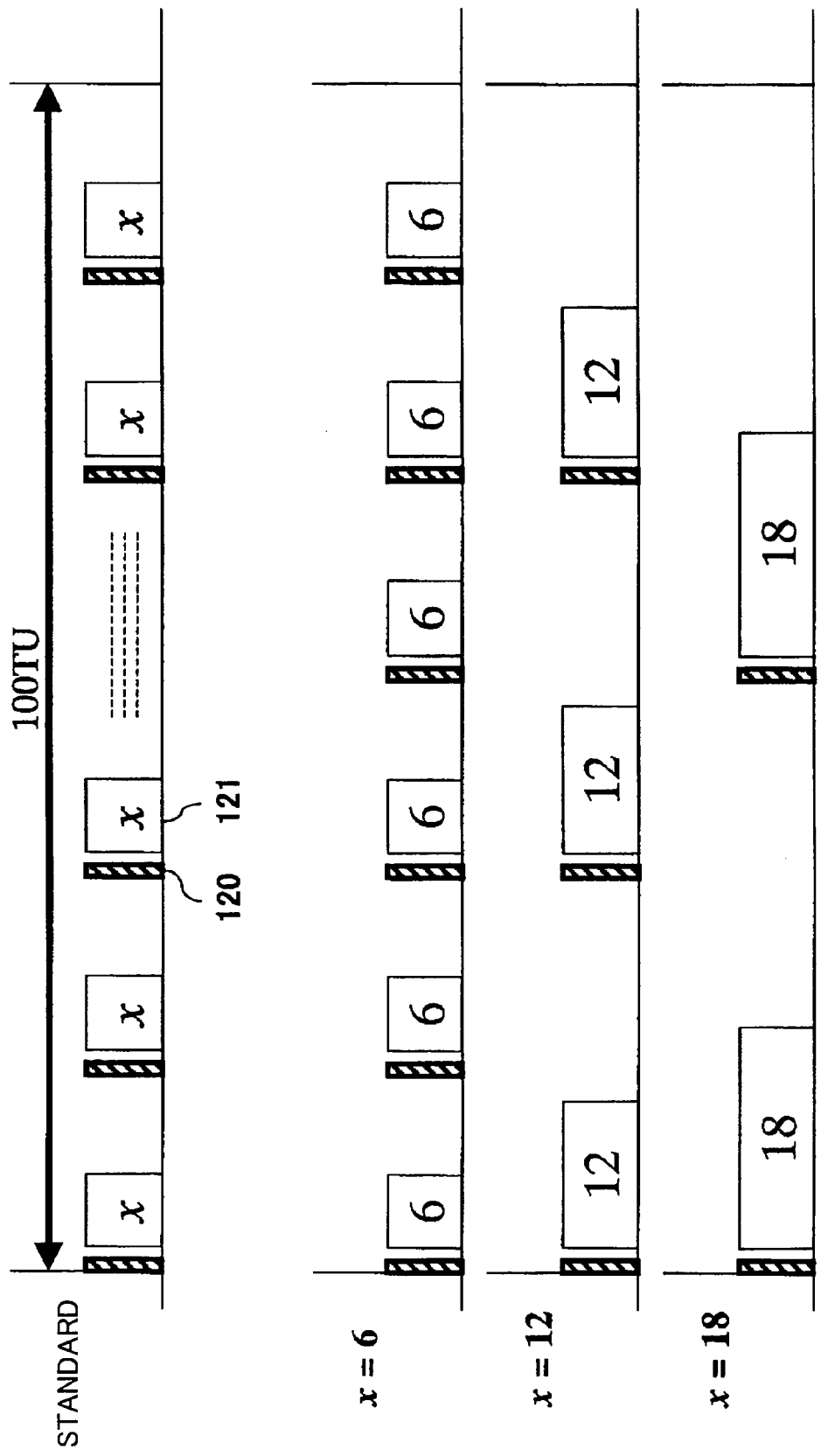
FIG. 15 is a diagram showing one concrete example (Example 1) of the transmission right allocation carried out by the central management station.
Figure 16:
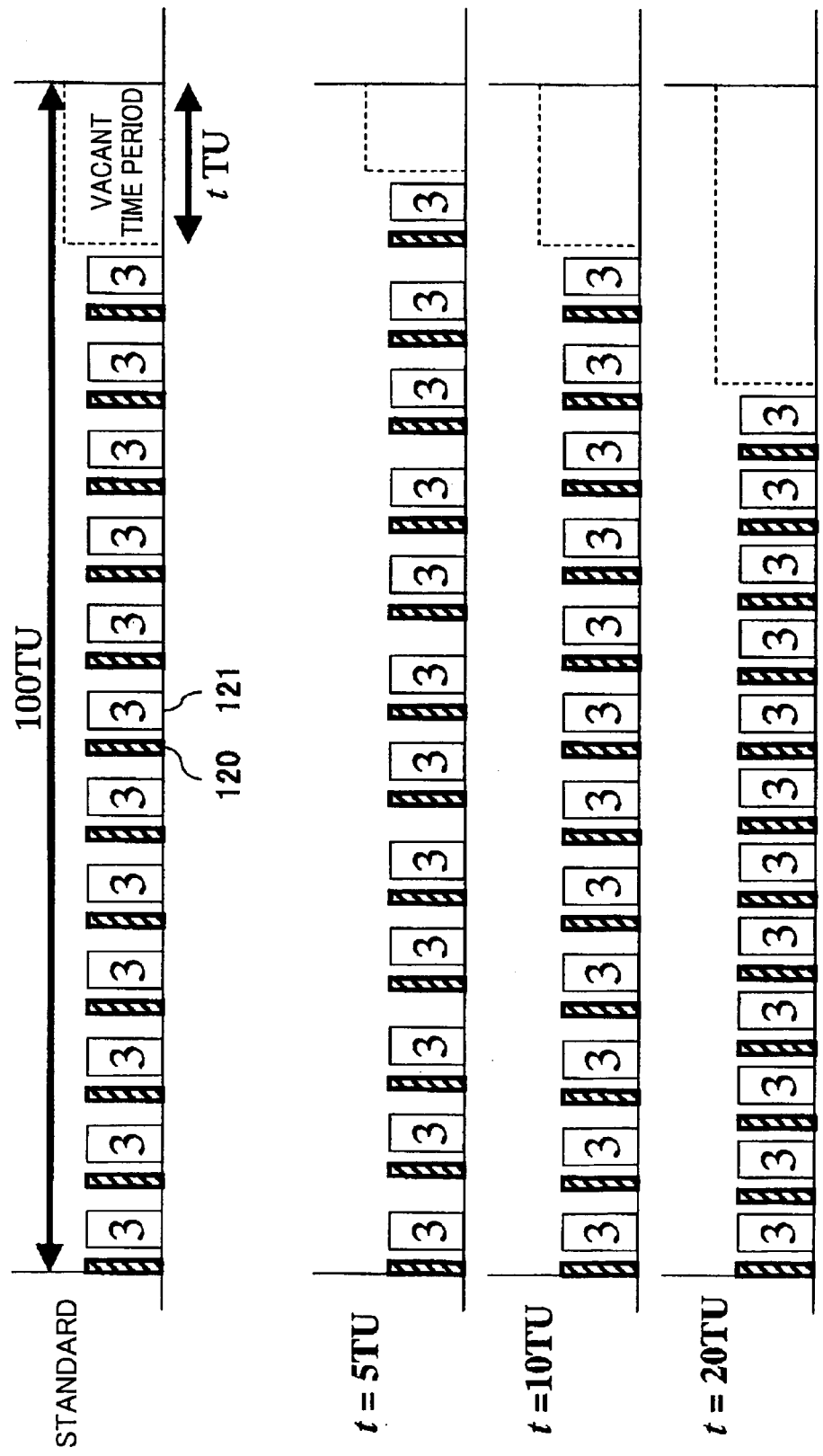
FIG. 16 is a diagram showing one concrete example (Example 2) of the transmission right allocation carried out by the central management station.
Figure 17:
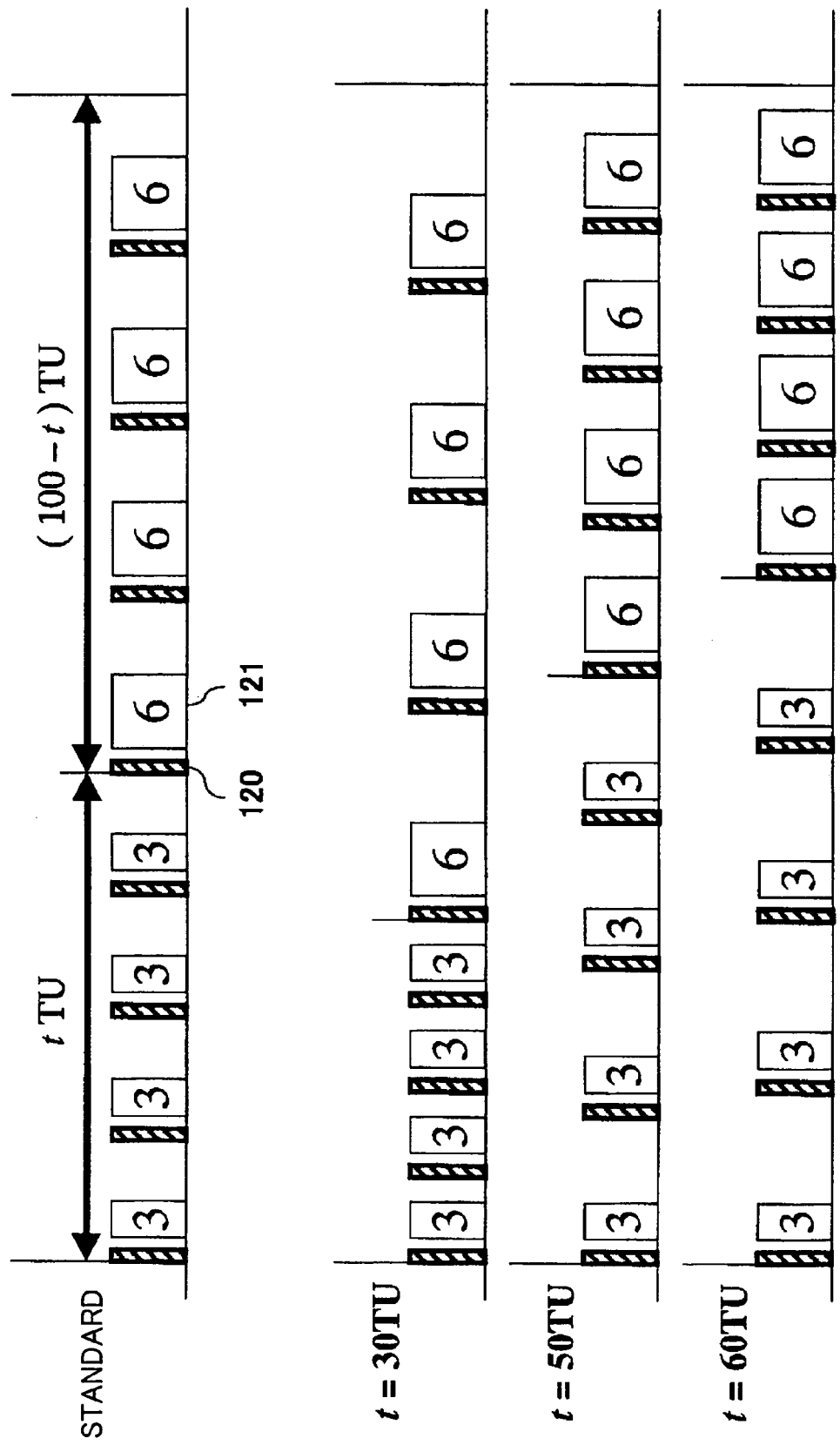
FIG. 17 is a diagram showing one concrete example (Example 3) of the transmission right allocation carried out by the central management station.
Figure 18:
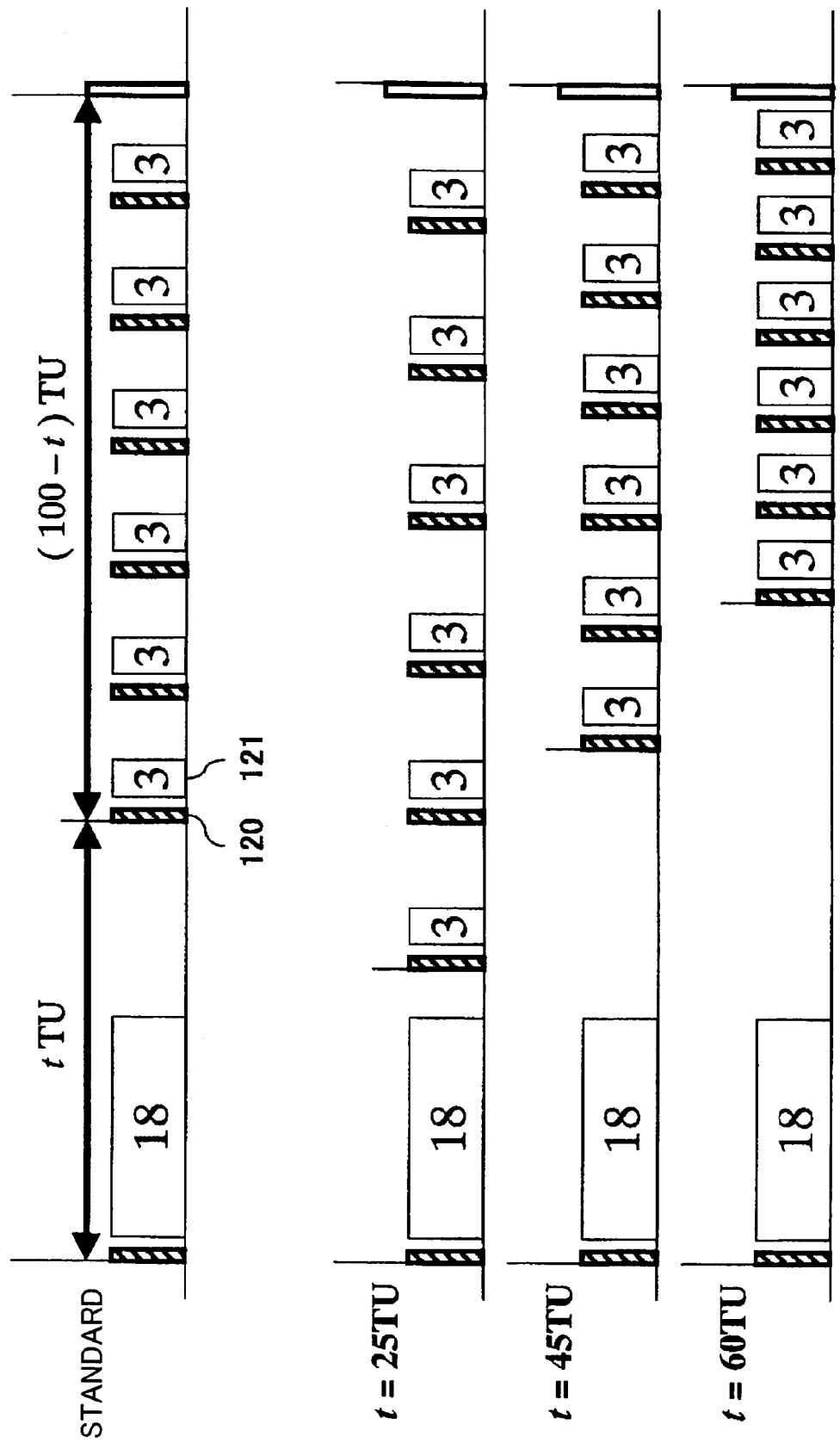
FIG. 18 is a diagram showing one concrete example (Example 4) of the transmission right allocation carried out by the central management station.
Figure 19:
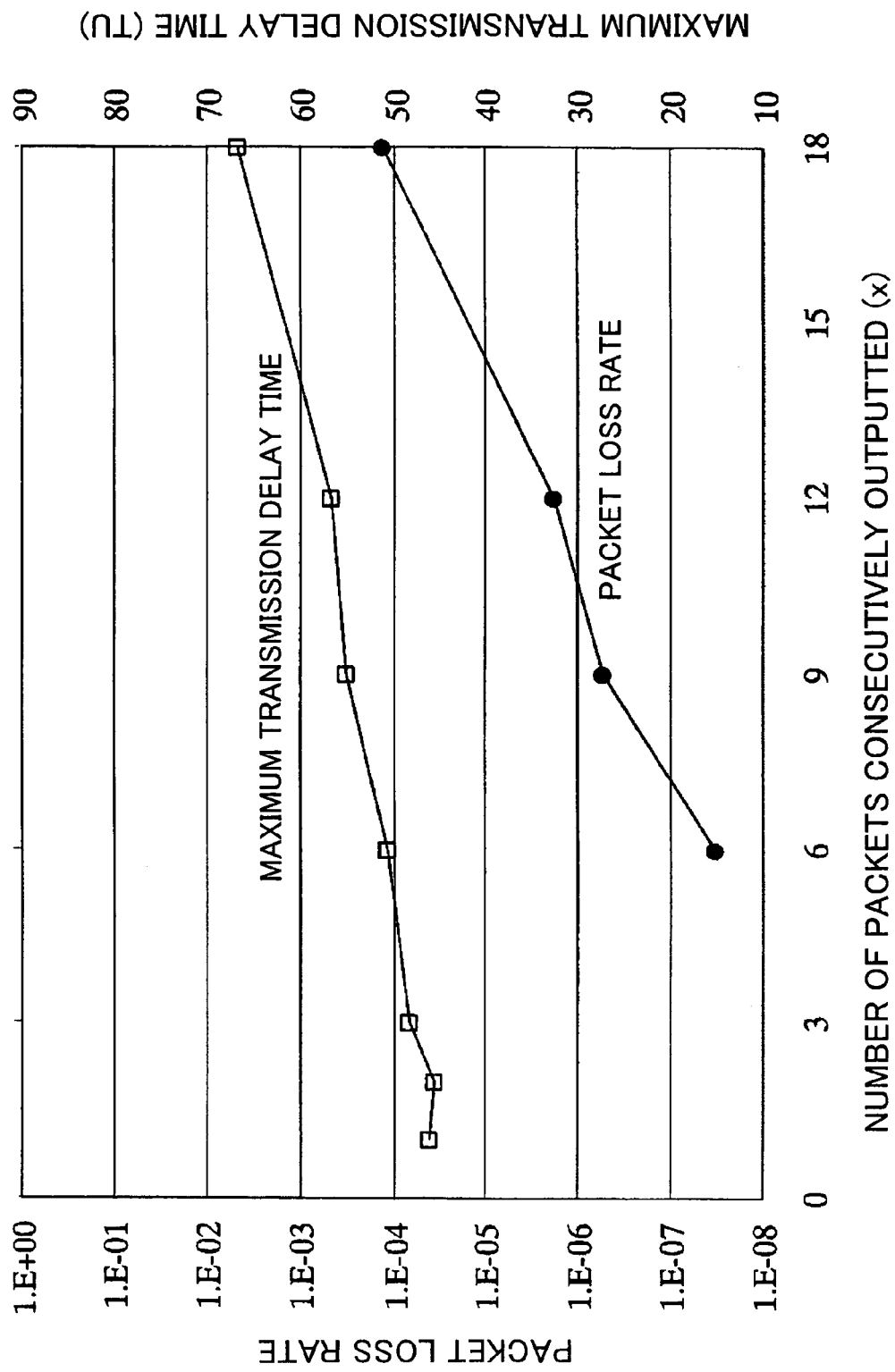
FIG. 19 is a diagram showing a performance achieved by the concrete example (Example 1) of the transmission right allocation carried out by the central management station.
Figure 20:
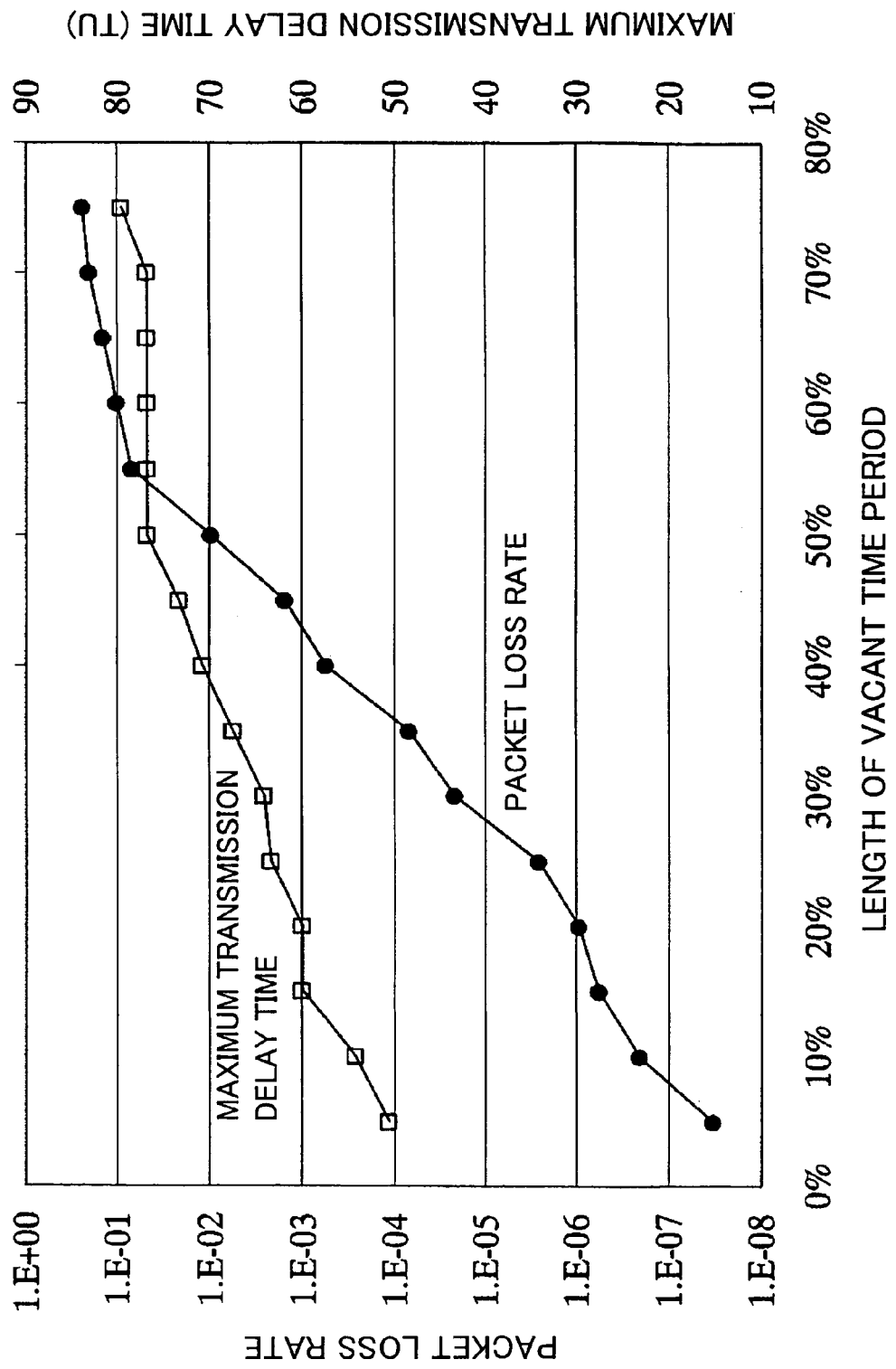
FIG. 20 is a diagram showing a performance achieved by the concrete example (Example 2) of the transmission right allocation carried out by the central management station.
Figure 21:
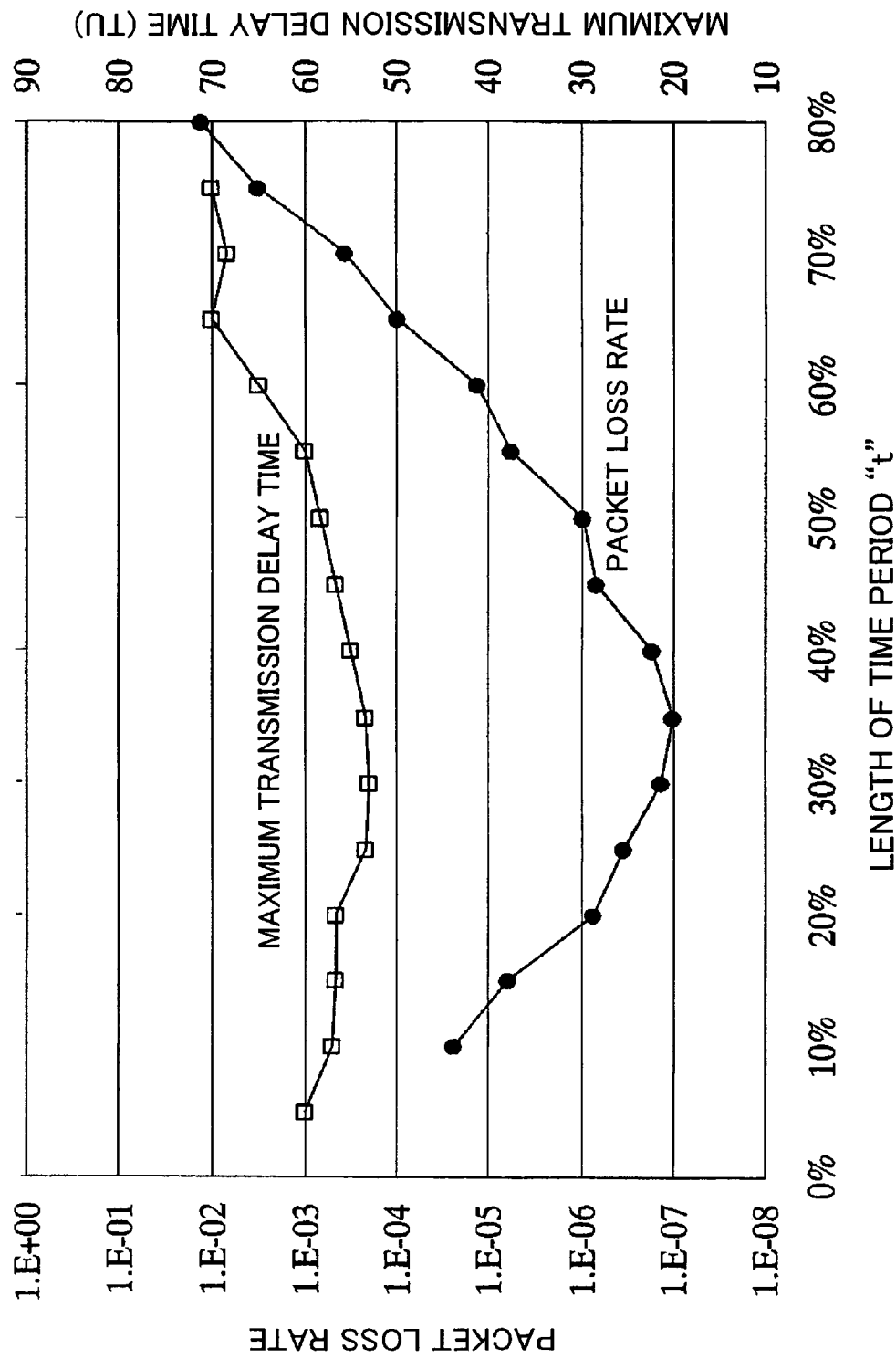
FIG. 21 is a diagram showing a performance achieved by the concrete example (Example 3) of the transmission right allocation carried out by the central management station.
Figure 22:
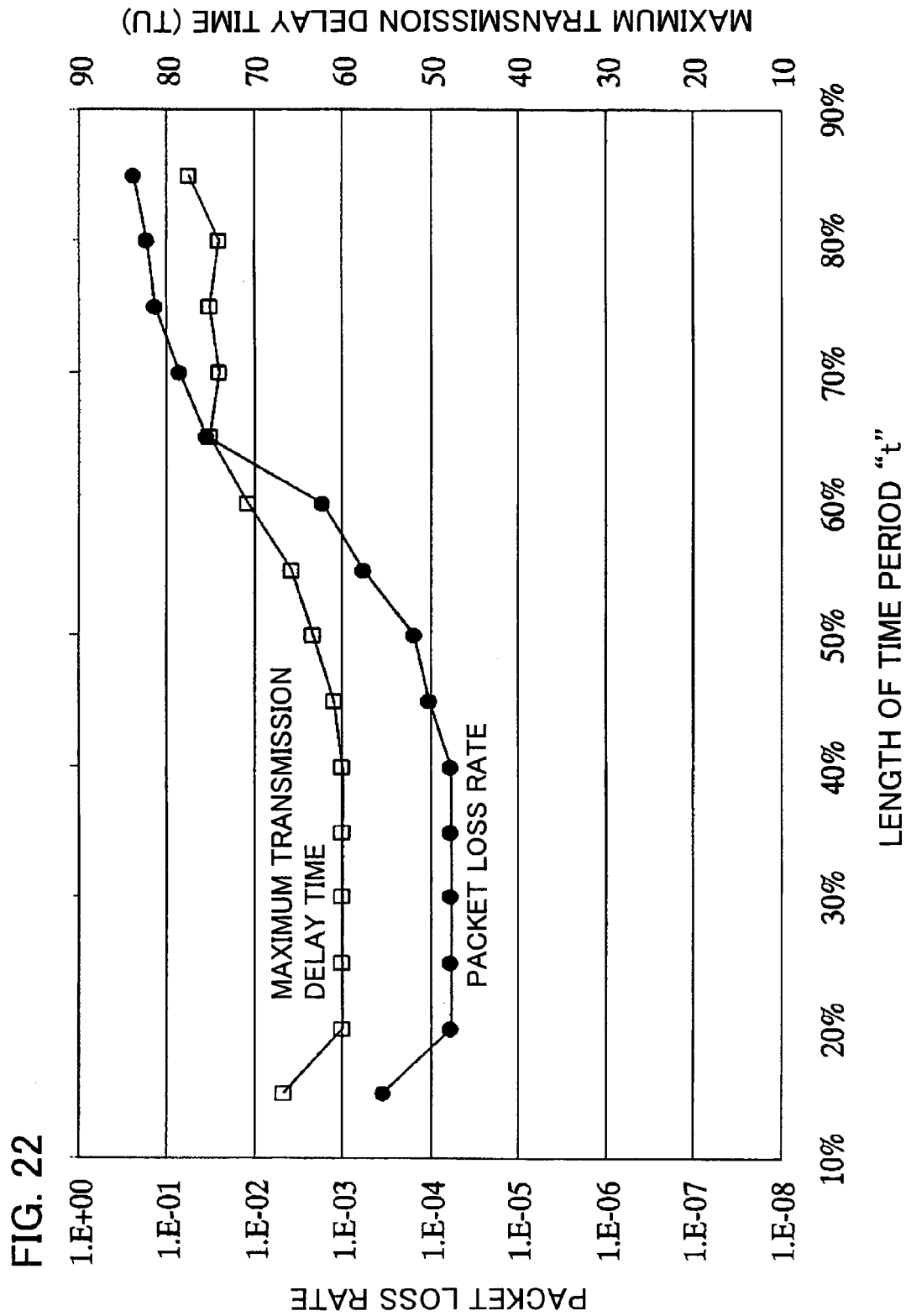
FIG. 22 is a diagram showing a performance achieved by the concrete example (Example 4) of the transmission right allocation carried out by the central management station.

The following discusses patterns of the transmission right granted time periods allocated by the central control station in the case in which the state of the communication is temporarily deteriorated. According to the current draft, the number of MSDUs remained in the communication station is accordingly reported to the central control station by using a packet or the like called QoS Null. Then, in the case in which the central control station finds out that the number of not-yet-transmitted MSDUs remained in the communication station is increased because of the deterioration of the state of the communication, the central control station may grant, to the communication station, more transmission rights than usual. FIG. 14 is a diagram showing a concrete example in which the central control station temporarily grants more transmission rights than usual when periodically carrying out the transmission right allocation with respect to the communication station. According to FIG. 14, the communication control condition is always satisfied even in the case in which the central control station temporarily grants more transmission rights than usual.

Generally, the communication control condition is always satisfied even in the case in which, when the central control station is carrying out the transmission right allocation satisfying the communication control condition, any transmission right allocation is further added to the above transmission right allocation. Here, before the additional transmission right allocation is added to the original transmission right allocation, the transmission rights are so granted according to the original transmission right allocation that "the sum of transmission right granted time periods actually granted in the time period {t0, t0+t} is always equal to or more than C·t−TXOP bound where t0 indicates an arbitrary time point". Therefore, it is obvious that the communication control condition is always satisfied even after the additional transmission right allocation is added to the transmission right allocation satisfying the communication control condition.

Figure 23:
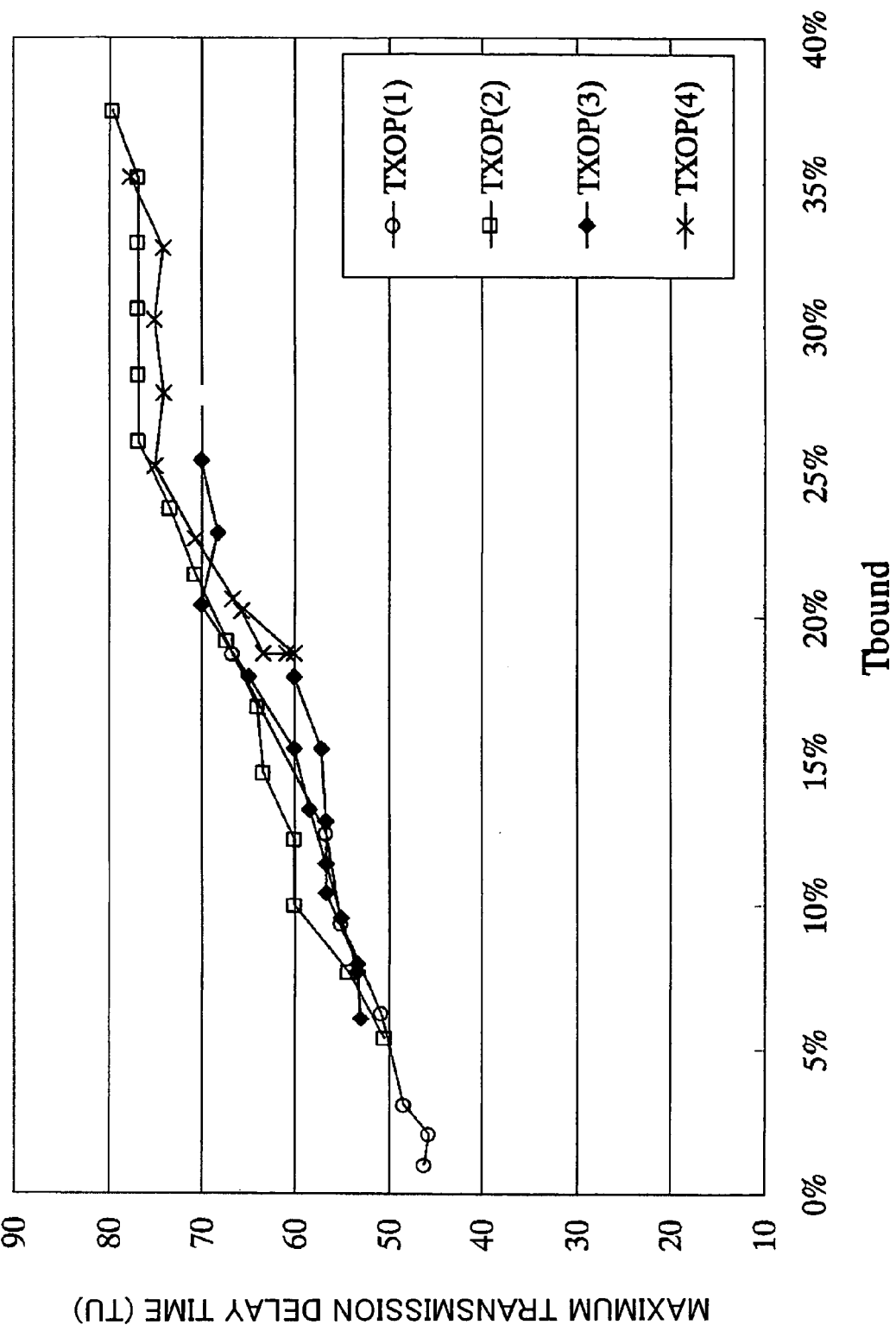
FIG. 23 is a diagram showing a relationship between T bound and a maximum transmission delay time, in the concrete examples (Examples 1 to 4) of the transmission right allocation carried out by the central management station.
Figure 24:
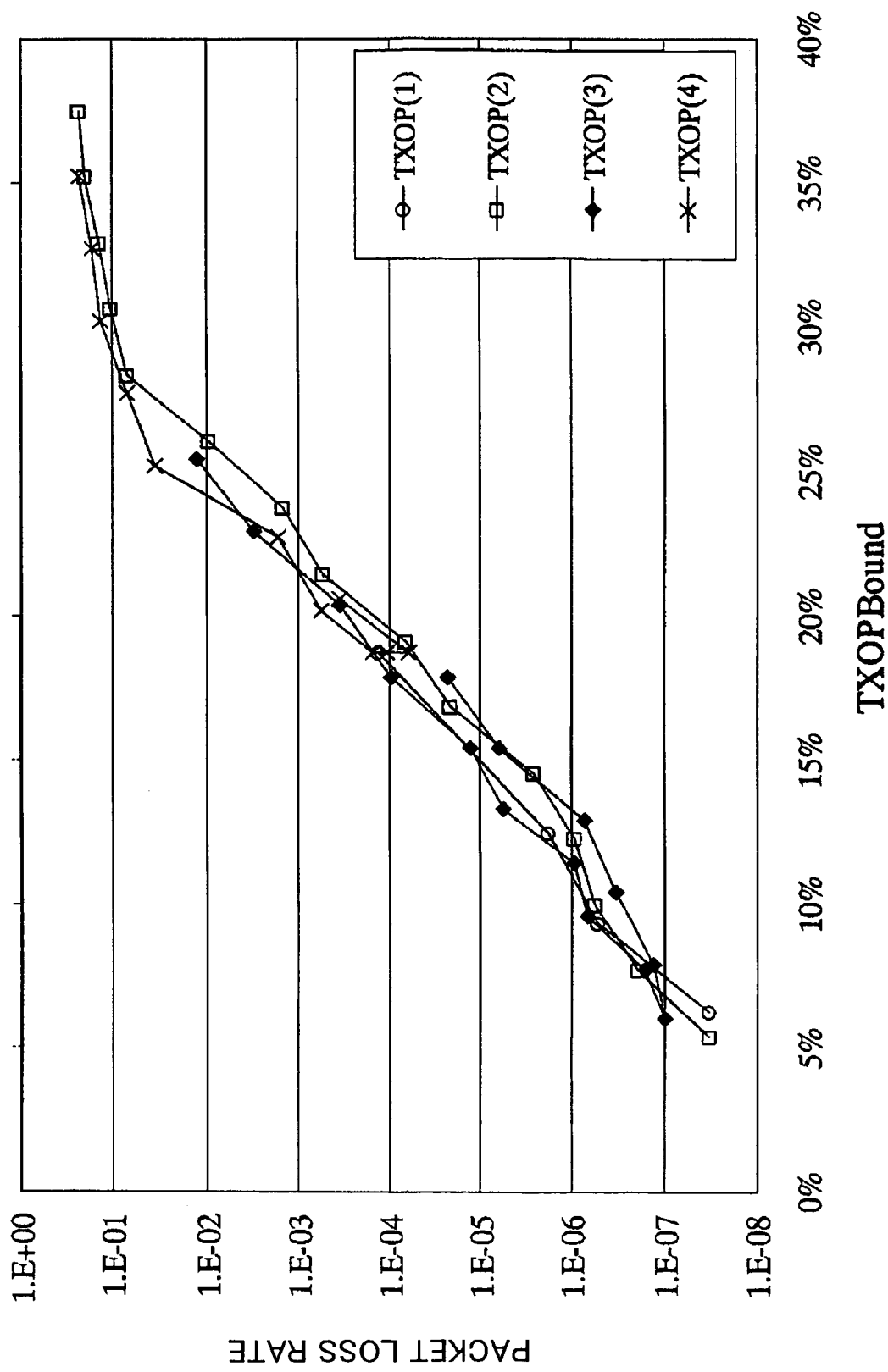
FIG. 24 is a diagram showing a relationship between T bound and a packet loss rate, in the concrete examples (Examples 1 to 4) of the transmission right allocation carried out by the central management station.

FIGS. 23 and 24 illustrate a relationship of the value of T bound, the maximum transmission delay time, and the packet loss rate. The value of T bound of each TXOP allocation is calculated in the case in which the central control station carries out various TXOP allocations according to FIGS. 15 to 18. FIGS. 23 and 24 show that, as long as the value of T bound is limited, the maximum transmission delay time, the packet loss rate, and the like performance are of the same quality even when the central control station carries out any transmission right allocation.

In the above embodiment, the value of TXOP bound (T bound) is determined by the negotiation between the central control station and the communication station. However, there may be a protocol in which the value of TXOP bound (T bound) is determined by the central control station according to the parameters of TSPEC. More specifically, the central control station may determine the value of TXOP bound (T bound) (i) as a function of the TSPEC parameter T max indicating "a maximum time interval between two successive times at which polling is desired", or (ii) as a function of the TSPEC parameter T delay indicating "a maximum tolerable delay time of transmission data to be transmitted by the communication station". In the case in which the communication station has a plurality of streams, the central control station may determine the value of TXOP bound (T bound) as a function of the minimum T max in a plurality of TSPEC parameters of the streams, or as a function of the minimum T delay.

A simplest implementation method of suppressing the difference Diff is just to allocate TXOPs uniformly. The central control station should be arranged such that in the case in which the difference Diff can not keep at or below C·T max even when the TXOPs are allocated adequately uniformly, the central control station (i) rejects to accept the stream or (ii) negotiates with the communication station to change the C·T max to a larger value (that is, to change at least one of C and T max to a larger value).

In the implementation in which the TXOPs are allocated uniformly, it becomes difficult to accept the second and third streams. In the case in which the central control station would like to receive more streams at the same time, the central control station has to find a pattern of the TXOP allocation that satisfies all the communication control conditions requested by the stations. However, this problem generally belongs to NP-hard problems. Therefore, the pattern of the TXOP allocation that satisfies all the communication control conditions needs to be found by checking all kinds of patterns. This search should be carried out on the central control station's receiving the TSPEC from the communication station. In the case in which the desired pattern is not found, the central control station should (i) reject to accept the stream or (ii) negotiate with the communication station to change the C·T max to a larger value.

As described above, the transmission right granted time periods are set so that the difference between the actual and reference values of transmission right granted time periods is always limited according to a constant TXOP bound smaller than the product of the coefficient C and the maximum tolerable delay time. That is, a constant lower limit (TXOP bound) is set for each actual value of the sum, at each time point, of transmission right granted time periods. In this way, it becomes possible to obtain the communication path quality requested by the transmission station with respect to the communication path. That is, especially in a communication network in which the packet error rate is comparatively high, it becomes possible to obtain the communication path quality, requested by the transmission station with respect to the communication path, by determining, while maintaining flexibility of the scheduling carried out by the central control station, (i) a condition which should be considered when determining the transmission time allocation by the central control station with respect to the transmission station, or (ii) a guideline for determining the burst length for carrying out the burst transmission by the transmission station.

In the above example, in order to obtain the value of C in Point 1, a protocol is discussed by using the following formulas:

$$T\text{ avg} = A\text{ surp} \cdot T\text{ normal }(B\text{ nom}, R\text{ PHY\_MIN})/((1-PER));$$

$$R1 = B\text{ nom}/T\text{ avg; and}$$

$$C = R\text{ mean}/R1.$$

In the case of using A surp' instead of A surp, a protocol can be discussed by using the following formulas:

$$T\text{ avg}' = A\text{ surp}' \cdot T\text{ normal}(B\text{ nom}, R\text{ PHY\_MIN});$$

$$R1' = B\text{ nom}/T\text{ avg}'; \text{ and}$$

$$C' = R\text{ mean}/R1'.$$

The present invention is also applicable to this case similarly.

In the above example, the lower limit (TXOP bound) is set for each actual value of the sum, at each time point, of transmission right granted time periods. However, it is also possible to set both the lower and upper limits. That is, the scheduling for granting the transmission right may be carried out so that, by using C, TXOP1 bound, T1 bound, TXOP2 bound, and T2 bound satisfying the following Formulas 4 to 6, the sum of transmission right granted time periods actually granted in the time {t0, t0+t} is (i) always equal to or more than the lower limit $C \cdot t - TXOP1$ bound and (ii) equal to or less than the upper limit $C \cdot t + TXOP2$ bound, where t0 is an arbitrary time point.

$$0 \leq T1 \text{ bound} < T \text{ delay}, 0 \leq T2 \text{ bound} \qquad \text{Formula 4:}$$

$$0 < C < 1 \qquad \text{Formula 5:}$$

$$TXOP1 \text{ bound} = C \cdot T1 \text{ bound} \qquad \text{Formula 6:}$$

$$TXOP2 \text{ bound} = C \cdot T2 \text{ bound}$$

Figure 3:
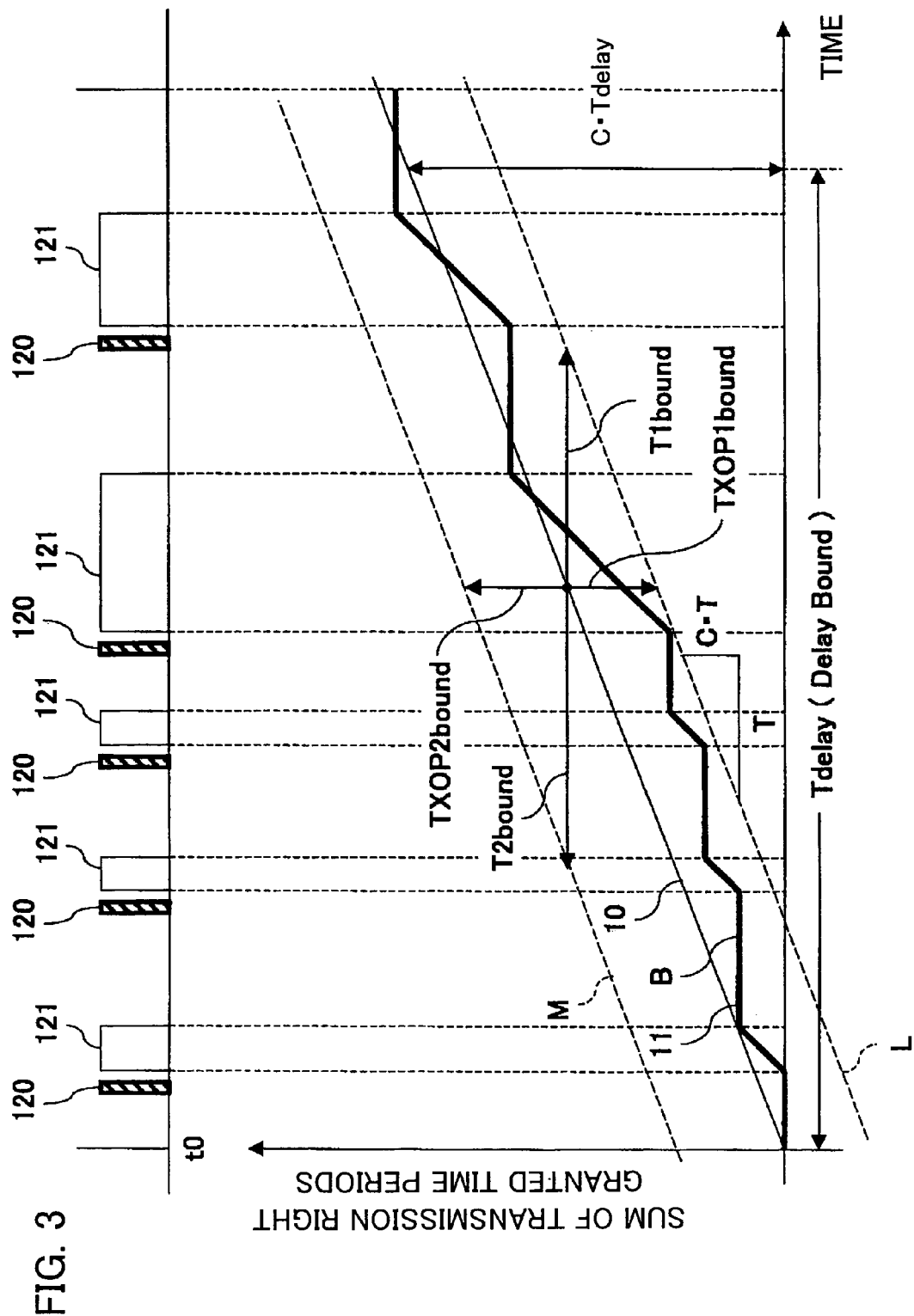
FIG. 3 is a diagram showing rules which need to be obeyed by all the central control stations in the network system in accordance with the one embodiment of the present invention.
Figure 4:
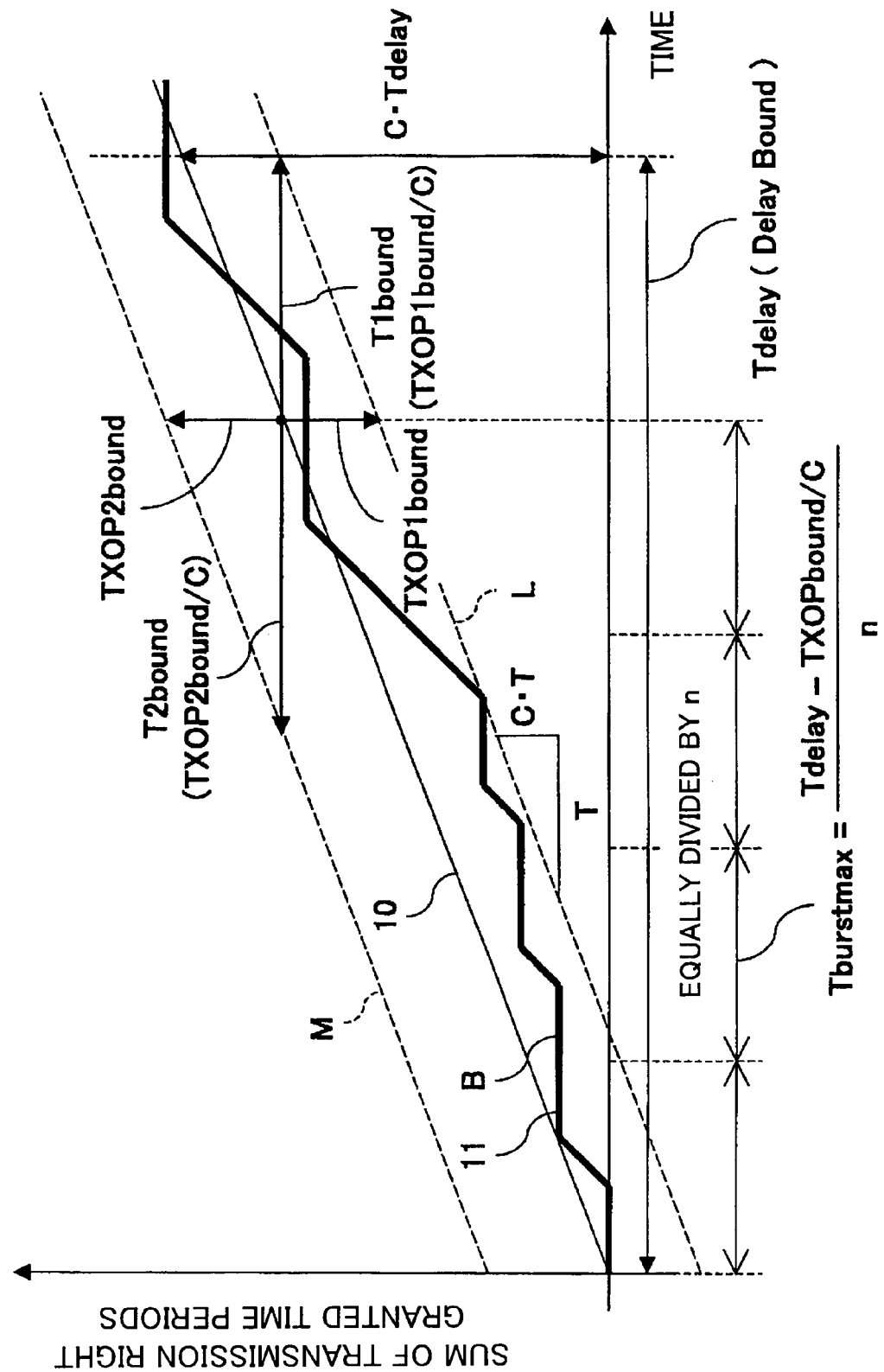
FIG. 4 is a diagram showing a method of determining the burst length when the transmission station carries out a burst transmission in the network system in accordance with the one embodiment of the present invention.
Figure 5:
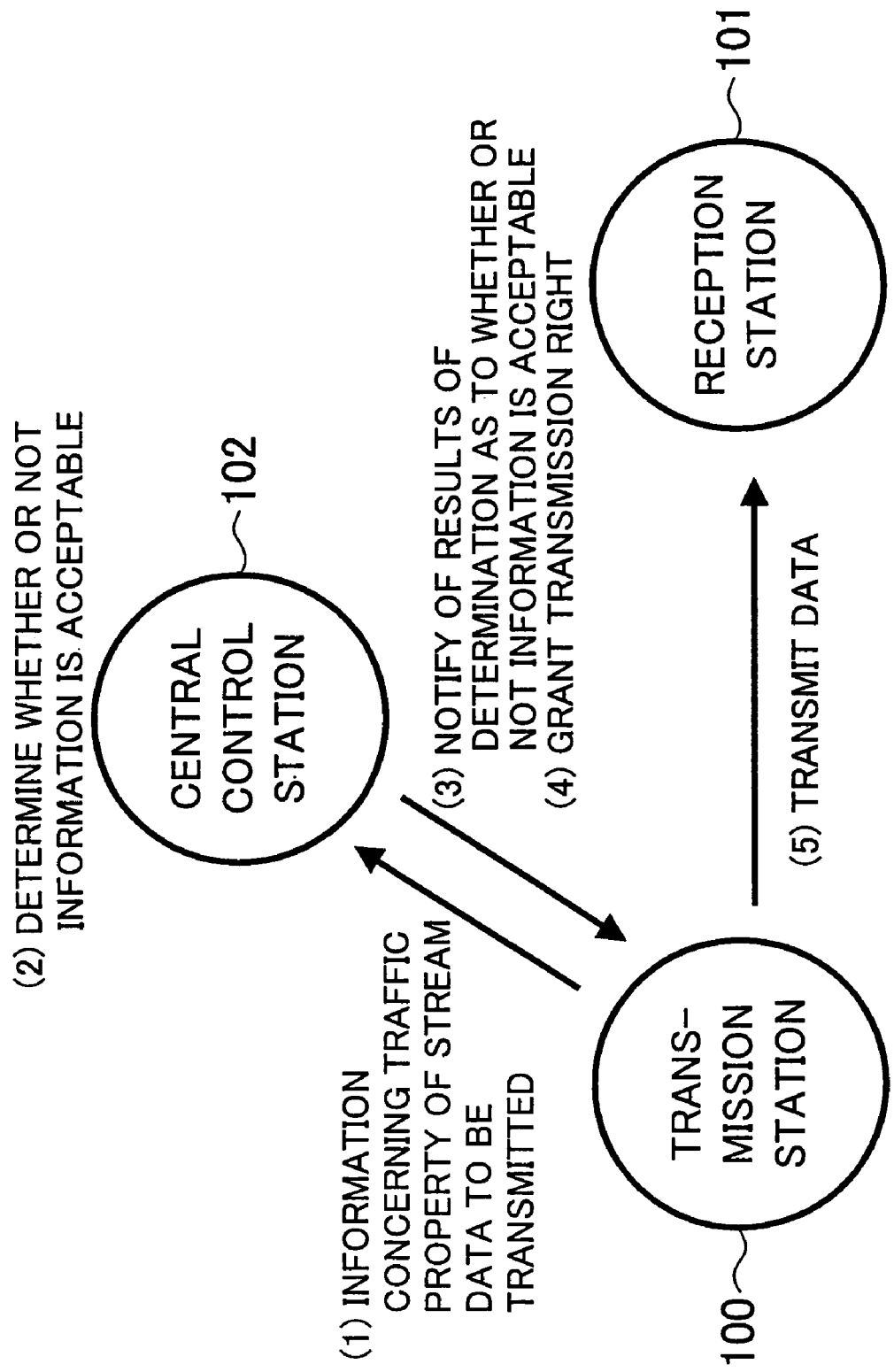
FIG. 5 is a diagram showing a mechanism for securing a bandwidth by the central control station.
Figure 6:
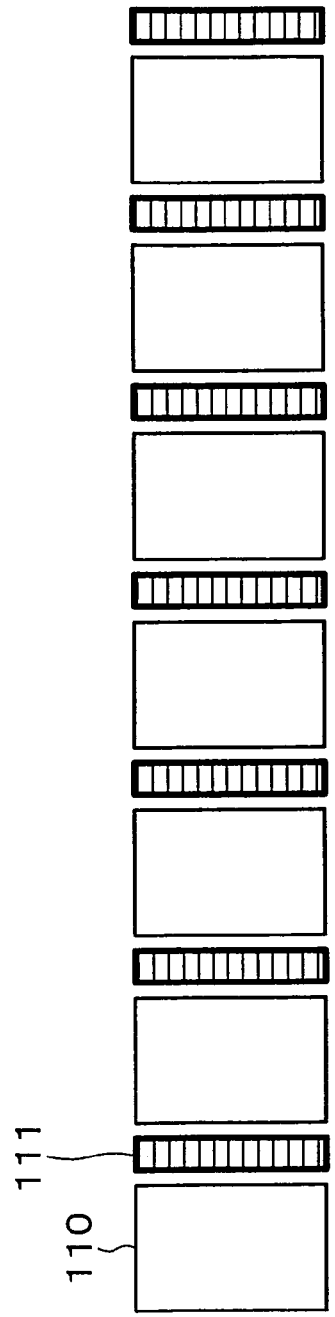
FIGS. 6(a) and 6(b) are diagrams showing a mechanism of notification of acknowledgements.
Figure 6:
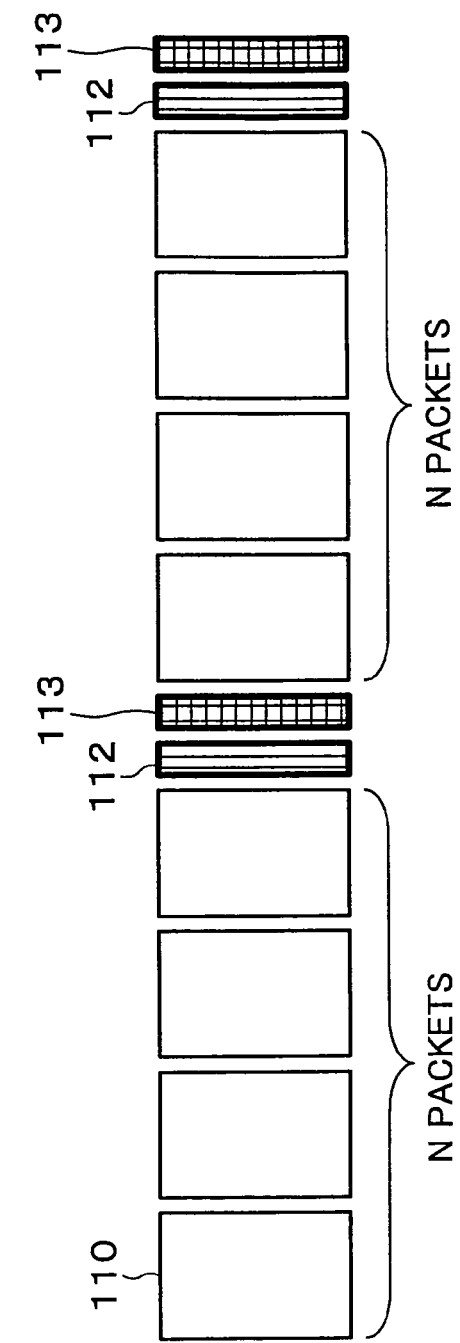
Figure 9:
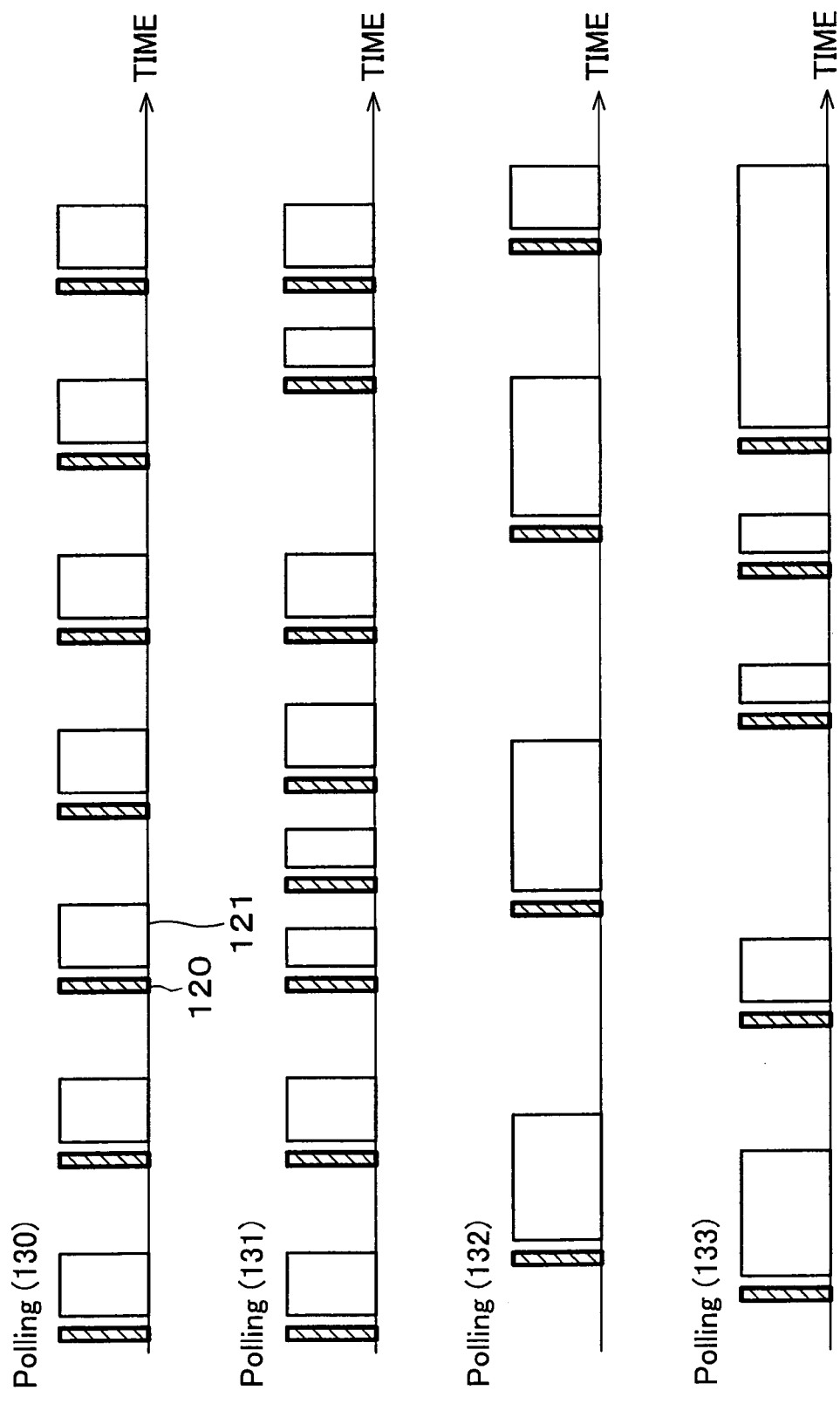
FIG. 9 is a diagram showing one example of transmission right allocations carried out by the central management station.
Figure 10:
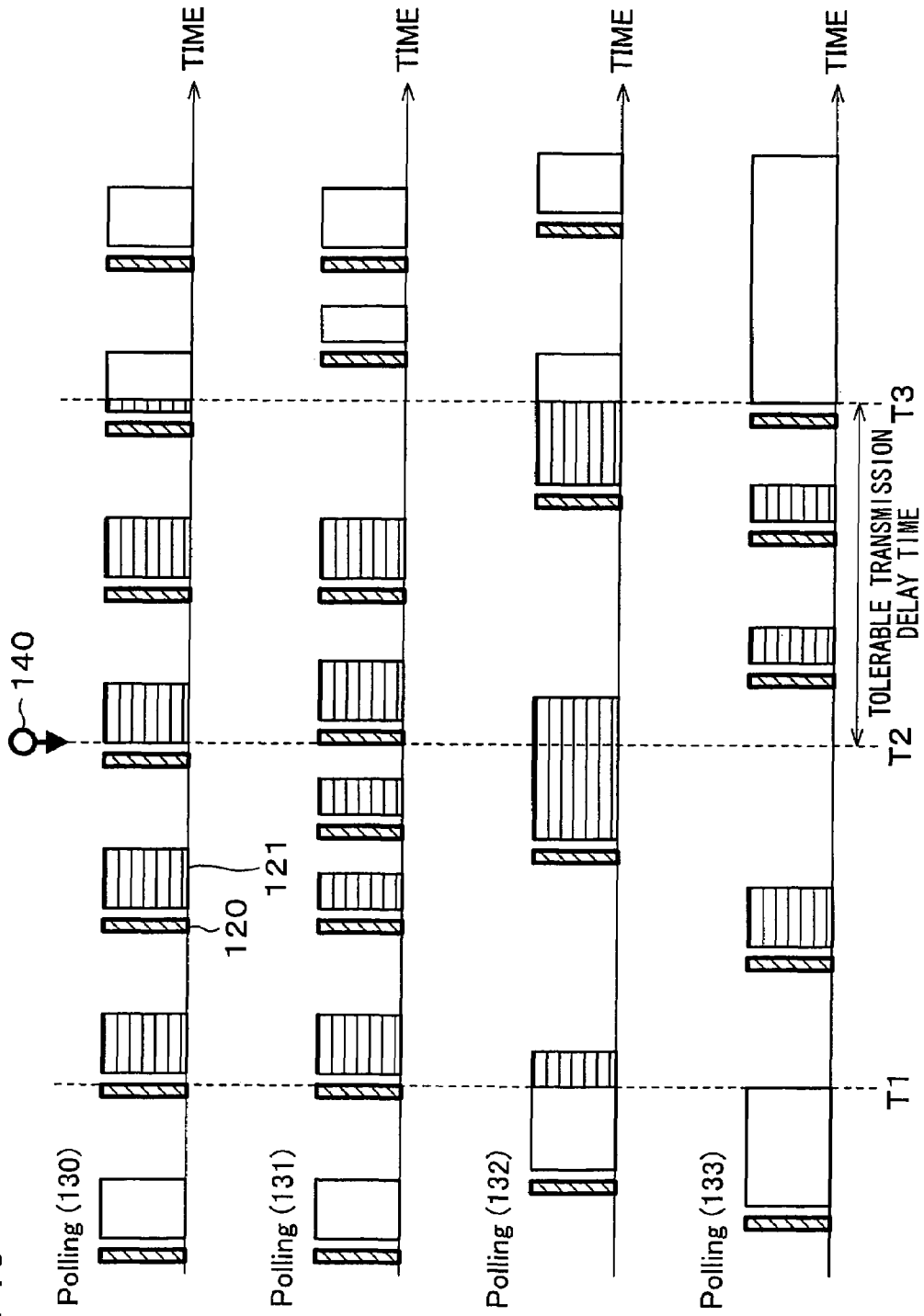
FIG. 10 is a diagram showing one example of the transmission right allocations carried out by the central management station.

The upper limit is indicated by a straight line M in FIGS. 3 and 4, and the lower limit is indicated by a straight line L in FIGS. 3 and 4.

The communication management method described above is realized by a program for carrying out the communication management process. The program is stored in a computer-readable recording medium.

Here, the above recording medium is arranged so as to be separable from the main body of the central control station, and may be read by being inserted into a program reading device provided as an external storage device. Examples of the recording medium are (i) tape-type recording medium, such as electromagnetic tapes, cassette tapes, and the like (ii) disc-type recording medium, magnetic discs (such as flexible discs, hard discs, and the like), and optical discs (such as CD-ROMs, MOs, MDs, and DVDs), and (iii) card-type recording mediums, such as IC cards (including memory cards), optical cards, and the like. Moreover, the recoding medium may be a medium fixedly storing a program, such as semiconductor memories, such as mask ROMs, EPROMs, EEPROMs, flash ROMs, and the like.

The embodiments and concrete examples of implementation discussed in the foregoing detailed explanation serve solely to illustrate the technical details of the present invention, which should not be narrowly interpreted within the limits of such embodiments and concrete examples, but rather may be applied in many variations within the spirit of the present invention, provided such variations do not exceed the scope of the patent claims set forth below.

INDUSTRIAL APPLICABILITY

The present invention relates to communication in a network in which a plurality of communication stations share one network path in a time-divisional manner, such as wireless communication conforming to IEEE 802.11, and the present invention can be used by communication devices and the like.

The invention claimed is:

1. A method of managing communication, comprising the step of causing a central control station to schedule such that allowance to transmit data is given, as a transmission right, to only one of communication stations in each time period by determining a timing of transmitting data from a communication station that is to transmit the data, to a communication station that is to receive the data, the method comprising the step of:

causing the central control station to carry out the scheduling at any time t, by using parameters C, TXOP bound, and T bound, so that a sum of transmission right granted time periods actually granted in a time period {t0, t0+t} is always equal to or more than $C \cdot t - TXOP$ bound where t0 is an arbitrary time point, C is an average rate of change of the sum of the transmission right granted time periods allocated, to the communication station that is to transmit the data, by the central control station according to a reference transmission right allocation, and T delay is a maximum tolerable delay time of the data to be transmitted by the communication station that is to transmit the data, C, TXOP bound, and T bound satisfying following formulas:

$$0 \leq T \text{ bound} < T \text{ delay}; \qquad \text{Formula 1}$$

$$0 < C < 1; \text{ and} \qquad \text{Formula 2}$$

$$TXOP \text{ bound} = C \cdot T \text{ bound} \qquad \text{Formula 3.}$$

2. A method of managing communication, comprising the step of causing a central control station to schedule such that allowance to transmit data is given, as a transmission right, to only one of communication stations in each time period by determining a timing of transmitting data from a communication station that is to transmit the data, to a communication station that is to receive the data, the method comprising the step of:

causing the central control station to carry out the scheduling, by using parameters C and Tbound, so that a sum of transmission right granted time periods actually granted in a time period {t1, t2} is always equal to or more than $C \cdot \{(t2 - T \text{ bound}) - t1\}$ where t1 and t2 are arbitrary time points (t1<t2), C is an average rate of change of the sum of the transmission right granted time periods allocated, to the communication station that is to transmit the data, by the central control station according to a reference transmission right allocation, and T delay is a maximum tolerable delay time of the data to be transmitted by the communication station that is to transmit the data, C and T bound satisfying following formulae:

$$0 \leq T \text{ bound} < T \text{ delay} \qquad \text{Formula 1}$$

$$0 < C < 1 \qquad \text{Formula 2.}$$

3. A method of managing communication, comprising the step of causing a central control station to schedule such that allowance to transmit data is given, as a transmission right, to only one of communication stations in each time period by determining a timing of transmitting data from a communication station that is to transmit the data, to a communication station that is to receive the data, the method comprising the step of:

causing the central control station to carry out the scheduling, by using a parameter Tbound and based on information concerning a traffic property of the data or a polling request, so that a sum of transmission right granted time periods actually granted in a time period {t1, t2} is a value equal to or more than a value of a time period necessary for transmitting MSDUs arriving in a time period (t1, t2−T bound), where t1 and t2 are arbitrary time points (t1<t2), and T delay is a tolerable maximum delay time (Delay bound) of the data to be transmitted by said one communication station, T bound satisfying a following formula:

$$0 \leq T \text{ bound} < T \text{ delay} \quad \text{Formula 1.}$$

4. A method of managing communication, comprising the step of causing a central control station to schedule such that allowance to transmit data is given, as a transmission right, to only one of communication stations in each time period by determining a timing of transmitting data from a communication station that is to transmit the data, to a communication station that is to receive the data, the method comprising the step of:

causing the central control station to carry out the scheduling so that (i) a value smaller than a maximum tolerable delay time Tdelay (Delay bound) of the data to be transmitted by the communication station that is to transmit the data is used as a maximum value of an interval between two successive timings of granting the transmission right, and (ii) a sum of transmission right granted time periods actually granted in a time period {t1, t2} is a value equal to or more than a value of a time period necessary for transmitting MSDUs of a normal MSDU size arriving in a time period (t1, t2−T bound) with a mean data rate of a traffic, where t1 and t2 are arbitrary time points (t1<t2), and Tbound satisfies the condition: 0≦Tbound<Tdelay.

5. A method of managing communication, comprising the step of causing a central control station to schedule such that allowance to transmit data is given, as a transmission right, to only one of communication stations in each time period by determining a timing of transmitting data from a communication station that is to transmit the data, to a communication station that is to receive the data, the method comprising the step of:

causing the central control station to carry out the scheduling at any time t, by using parameters C, TXOP1 bound, T1 bound, TXOP2 bound, and T2 bound, so that a sum of transmission right granted time periods actually granted in a time period {t0, t0+t} is always equal to or more than C·t−TXOP1 bound and equal to or less than C·t+TXOP2 bound where t0 is an arbitrary time point, C is an average rate of change of the sum of the transmission right granted time periods allocated, to the communication station that is to transmit the data, by the central control station according to a reference transmission right allocation, and T delay is a maximum tolerable delay time of the data to be transmitted by the communication station that is to transmit the data, C, TXOP1 bound, T1 bound, TXOP2 bound, and T2 bound satisfying the following formulas:

$$0 \leq T1 \text{ bound} < T \text{ delay}, \ 0 \leq T2 \text{ bound}; \quad \text{Formula 4}$$

$$0 < C < 1; \text{ and} \quad \text{Formula 5}$$

$$TXOP1 \text{ bound} = C \cdot T1 \text{ bound}, \quad \text{Formula 6}$$

$$TXOP2 \text{ bound} = C \cdot T2 \text{ bound}.$$

6. The method as set forth in claim 1, wherein:

a communication station transmitting a data packet under a control of the central control station previously reserves, to the control station, information concerning a traffic property of the data packet, and the central control station uses the information when determining the reference transmission right allocation, the information given from each communication station.

7. The method as set forth in claim 1, wherein:

the central control station uses a fixed value as a concrete value of TXOP bound or T bound.

8. The method as set forth in claim 1, comprising the step of causing the central control station to concretely determine TXOP bound or T bound according to information given from a communication station side.

9. The method as set forth in claim 8, comprising the step of causing the central control station to concretely determine TXOP bound or T bound as a function of a maximum time interval between two successive times at which polling is desired, T max, requested from said communication station side.

10. The method as set forth in claim 9, comprising the step of causing the central control station to concretely determine TXOP bound such that TXOP bound is especially C·T max.

11. The method as set forth in claim 9, comprising the step of causing the central control station to concretely determine T bound such that T bound is especially T max.

12. The method as set forth in claim 8, comprising the step of causing the central control station to concretely determine that TXOP bound or T bound is a function of a smallest value among values of T max of a plurality of streams to be transmitted from the communication station side, where T max is a maximum time interval between two successive times at which polling is desired.

13. The method as set forth in claim 8, comprising the step of causing the central control station to concretely determine that TXOP bound or T bound is a function of T said delay where T delay is said maximum tolerable delay time of the data to be transmitted by the communication station.

14. The method as set forth in claim 8, comprising the step of causing the central control station to concretely determine that TXOP bound or T bound is a function of a smallest value among values of T delay of a plurality of streams to be transmitted by the communication station, where Tdelay is said maximum tolerable delay time of the data to be transmitted by the communication station.

15. The method as set forth in claim 1, wherein: transmission is burst transmission.

16. The method as set forth in claim 8, comprising the step of causing the central control station to concretely determine TXOP bound or T bound according to information concerning which to use, Normal ACK or Group ACK given from said communication station that is to receive the data.

17. The method as set forth in claim 1, comprising the step of causing a central control station to judge, according to the formulas:

$$0 \leq T\text{ bound} < T\text{ delay};\quad\quad\text{Formula 1}$$

$$0 < C < 1;\text{ and}\quad\quad\text{Formula 2}$$

$$TXOP\text{ bound} = C \cdot T\text{ bound},\quad\quad\text{Formula 3}$$

whether or not a new stream is able to be accepted.

18. A communication station wherein:
the communication station that is to transmit data is in a network adopting a method of managing communication, comprising the step of causing a central control station to schedule such that allowance to transmit data is given, as a transmission right, to only one of communication stations in each time period by determining a timing of transmitting data from a communication station that is to transmit the data, to a communication station that is to receive the data, the method comprising the step of:
causing the central control station to carry out the scheduling at any time t, by using parameters C, TXOP bound, and T bound, so that a sum of transmission right granted time periods actually granted in a time period $\{t0, t0+t\}$ is always equal to or more than $C \cdot t - TXOP$ bound where t0 is an arbitrary time point, C is an average rate of change of the sum of the transmission right granted time periods allocated, to the communication station that is to transmit the data, by the central control station according to a reference transmission right allocation, and T delay is a maximum tolerable delay time of the data to be transmitted by the communication station that is to transmit the data, C, TXOP bound, and T bound satisfying following formulas:

$$0 \leq T\text{ bound} < T\text{ delay};\quad\quad\text{Formula 1}$$

$$0 < C < 1;\text{ and}\quad\quad\text{Formula 2}$$

$$TXOP\text{ bound} = C \cdot T\text{ bound, and}\quad\quad\text{Formula 3}$$

if the communication station judges that the central control station does not satisfy the method,
the communication station that is to transmit data notifies a user of a fact that the transmission right granting carried out by the central control station does not satisfy minimum requirement or due to the central control station, problems occur when transmitting a stream data.

19. The method as set forth in claim 1, comprising the step of:
carrying out communication by using a mechanism in which:
(i) a communication station that is to transmit data obtains n by a following formula: using a packet error rate PER and a packet loss rate PLR of a communication path:

$$n = \text{ceiling }\{\log(PLR)/\log(PER)\},$$

where n is a desirable maximum number of times transmission is able to be carried out,
(ii) an average burst output cycle (T burst) is defined as a certain time period equal to or less than a time period T burstmax obtained by dividing, by n, a time period obtained by a formula (an tolerable transmission delay time−TXOP bound/C), and
(iii) a plurality of packets needed to be outputted in T burst are transmitted in a burst manner, and a reception station gives, to said communication station, acknowledgements with respect to the packets at once.

20. The method as set forth in claim 1, comprising the step of:
carrying out communication by using a mechanism in which:
(i) a communication station that is to transmit data obtains n by a following formula using a packet error rate PER and a packet loss rate PLR of a communication path:

$$n = \text{ceiling }\{\log(PLR)/\log(PER)\},$$

where n is a desirable maximum number of times transmission is able to be carried out,
(ii) an average burst output cycle (T burst) is defined as a certain time period equal to or less than a time period T burstmax obtained by dividing, by n, a time period obtained by a formula (an tolerable transmission delay time−TXOP bound/C), and
(iii) a plurality of packets needed to be outputted in T burst are transmitted in a burst manner, and a reception station notifies to the communication station that has transmitted data, acknowledgements with respect to the packets at once.

21. A method of managing communication, comprising the step of causing a central control station to schedule such that allowance to transmit data is given, as a transmission right, to only one of communication stations in each time period by determining a timing of transmitting data from a communication station that is to transmit the data, to a communication station that is to receive the data, the method comprising the step of:
causing said one communication station in each time period that is to transmit data to derive n by a following formula using a packet error rate PER and a packet loss rate PLR of a communication path:

$$n = \text{ceiling }\{\log(PLR)/\log(PER)\}$$

where n is a desirable maximum number of times transmission is able to be carried out; and
notifying the central control station that a time period equal to or less than a time period obtained by dividing, by n, a value of an tolerable transmission delay time T delay is "a maximum time interval between two successive times at which polling is desired".

22. The method as set forth in claim 21, comprising the step of carrying out communication by using a mechanism in which (i) the communication stations calculate a number of packets needed to be outputted in the maximum time interval between two successive times at which polling is desired, (ii) the packets are transmitted in a burst manner, and (iii) a reception station gives, to the communication station that has transmitted, acknowledgements with respect to a plurality of the received packets at once.

23. The method as set forth in claim 19, wherein: the communication stations use, as a concrete value of the packet error rate PER, a value of PER actually measured by each communication station.

24. The method as set forth in claim 20, wherein: the communication stations use, as a concrete value of the packet error rate PER, a value of PER actually measured by each communication station.

25. The method as set forth in claim 21, wherein: the communication stations use, as a concrete value of the packet error rate PER, a value of PER actually measured by each communication station.

26. The method as set forth in claim 19, wherein: the communication stations use a fixed value as a concrete value of the packet error rate PER.

27. The method as set forth in claim 20, wherein: the communication stations use a fixed value as a concrete value of the packet error rate PER.

28. The method as set forth in claim 21, wherein: the communication stations use a fixed value as a concrete value of the packet error rate PER.

29. The method as set forth in claim 21, being adopted especially in a wireless network.

30. The method as set forth in claim 21, being adopted especially in a power line network.

31. The method as set forth in claim 21, using a communication method conforming to IEEE Std 802.11e/D3.3 2002.

32. A central control station, managing communication according to a method of managing communication, comprising the step of causing a central control station to schedule such that allowance to transmit data is given, as a transmission right, to only one of communication stations in each time period by determining a timing of transmitting data from a communication station that is to transmit the data, to a communication station that is to receive the data, the method comprising the step of:

causing the central control station to carry out the scheduling at any time t, by using parameters C, TXOP bound, and T bound, so that a sum of transmission right granted time periods actually granted in a time period {t0, t0+t} is always equal to or more than C·t−TXOP bound where t0 is an arbitrary time point, C is an average rate of change of the sum of the transmission right granted time periods allocated, to the communication station that is to transmit the data, by the central control station according to a reference transmission right allocation, and T delay is a maximum tolerable delay time of the data to be transmitted by the communication station that is to transmit the data, C, TXOP bound, and T bound satisfying following formulas:

$$0 \leq T\text{ bound} < T\text{ delay};  \quad\quad\quad \text{Formula 1}$$

$$0 < C < 1; \text{ and} \quad\quad\quad \text{Formula 2}$$

$$TXOP\text{ bound} = C \cdot T\text{ bound} \quad\quad\quad \text{Formula 3.}$$

33. A communication station, carrying out communication according to a method of managing communication, comprising the step of causing a central control station to schedule such that allowance to transmit data is given, as a transmission right, to only one of communication stations in each time period by determining a timing of transmitting data from a communication station that is to transmit the data, to a communication station that is to receive the data, the method comprising the step of:

causing the central control station to carry out the scheduling at any time t, by using parameters C, TXOP bound, and T bound, so that a sum of transmission right granted time periods actually granted in a time period {t0, t0+t} is always equal to or more than C·t−TXOP bound where t0 is an arbitrary time point, C is an average rate of change of the sum of the transmission right granted time periods allocated, to the communication station that is to transmit the data, by the central control station according to a reference transmission right allocation, and T delay is a maximum tolerable delay time of the data to be transmitted by the communication station that is to transmit the data, C, TXOP bound, and T bound satisfying following formulas:

$$0 \leq T\text{ bound} < T\text{ delay};  \quad\quad\quad \text{Formula 1}$$

$$0 < C < 1; \text{ and} \quad\quad\quad \text{Formula 2}$$

$$TXOP\text{ bound} = C \cdot T\text{ bound} \quad\quad\quad \text{Formula 3.}$$

34. A computer-readable medium encoded with computer executable instructions for managing communication, said instructions causing a computer to execute the steps of the method of claim 1.

* * * * *